United States Patent [19]

Kingberg et al.

[11] Patent Number: 5,734,887
[45] Date of Patent: Mar. 31, 1998

[54] METHOD AND APPARATUS FOR LOGICAL DATA ACCESS TO A PHYSICAL RELATIONAL DATABASE

[75] Inventors: Denis G. Kingberg, Raleigh; Ellen Margaret McCubbin, Cary; William John Martin, Apex, all of N.C.

[73] Assignee: International Business Machines Corporation, Armonk, N.Y.

[21] Appl. No.: 536,737

[22] Filed: Sep. 29, 1995

[51] Int. Cl.$^6$ .................................................. G06F 17/30
[52] U.S. Cl. ........................................... 395/604; 395/611
[58] Field of Search ................................. 395/604, 611

[56] References Cited

U.S. PATENT DOCUMENTS

| | | | |
|---|---|---|---|
| 5,206,951 | 4/1993 | Khoyi et al. | 395/650 |
| 5,261,080 | 11/1993 | Khoyi et al. | 395/500 |
| 5,295,222 | 3/1994 | Wadhwa et al. | 395/1 |
| 5,303,379 | 4/1994 | Khoyi et al. | 395/700 |
| 5,307,484 | 4/1994 | Baker et al. | 395/600 |

OTHER PUBLICATIONS

Casey, Logical Data Interface, IBM TDB, vol. 16, No. 4, Sep. 1973 pp. 1203–1207.
Meltzer, Terminology and an Architecture on Data Independence, IBM TDB, vol. 14, No. 12, May 1972, pp. 3709–3712.
IBM TDB, vol. 29, No. 7, Dec. 1986, pp. 2894–2900, Larner, "Access Independent Query Definition in IBM DL/I".
IBM TDB, vol. 26, No. 5, Oct. 1983, pp. 2557–2559, Pullin et al, "Method for Accessing Hierarchical Views of a Binary Relational Database".
IBM TDB, vol. 32, No. 9B, Feb. 1990, pp. 98–102, Ritland, "Call–Type API to SQL/DS with Externally Described Operations".
IBM TDB, vol. 36, No. 7, Jul., '93, pp. 545–546, Anderson et al, "Code Generation for an Object Oriented Applications".
IBM TDB, vol. 28, No. 2, Jul. 1985, p. 561, Chan et al, "Isolating the Application Program from the Physical Database Organization".
Computer, Dec. 1986, pp. 26–36, Mark et al, "Metadata Management" Dec. 1986, Mark et al.
Computer, Dec. 1986, pp. 37–44, Wiederhold, "Views, Objects, and Databases", Gio Wiederhold.
Computer, Jan. 1986, pp. 63–73, Keller, "The Role of Semantics in Translating View Updates", Jan. 1986.
Article by P. Palvia, Memphis State University, Nat'l. Computer Conf.1987, pp. 573–582, "How sensitive is the physical database design? Results . . . ".
Byte, Apr. 1989, pp. 221–233, Orr et al, "Methodology: The Experts Speak".
ACM Trans. on Office Info. Systems, vol. 5, No. 1, Jan. 1987, pp. 48–69, Fishman et al. "Iris: An Object–Oriented Database Management System".
Computer, Dec. 1991, pp. 55–62, Collet et al, "Resource Integration Using a Large Knowledge Base in Carnot".
Dr. Dobb's Journal, Nov. 1994, pp. 36–40 & cont'd. "Database Management in C++".

*Primary Examiner*—Thomas G. Black
*Assistant Examiner*—Paul K. Lintz
*Attorney, Agent, or Firm*—John D. Flynn

[57] ABSTRACT

Logical Data Access to the physical structure of a relational database is provided for one or more Applications. Applications are developed using the logical entity types and logical entity type attribute names as described in a logical data model. The Applications then use a Logical Data Access Interface to access each of the required physical relational database tables via the Logical Data Access Layer. Applications then use logical entity type and logical entity type attribute names as specified in the Logical Data Model in making Logical Data Requests to the Logical Data Access Layer. The Logical Data Access Layer provides a rich set of functions for allowing an Application to control and manage a database, build and execute database queries and interface with physical database. The Logical Data Access Layer determines which of the physical tables and associated columns are required to satisfy the Application request and then builds one or more database query statements containing the appropriate physical table and column names.

16 Claims, 33 Drawing Sheets

| LOGTABLE | LOGCOLUMN |
|---|---|
| CUSTOMER | CUST_BIRTH_DATE |
| CUSTOMER | CUST_CITY |
| CUSTOMER | CUST_FIRST_NAME |
| CUSTOMER | CUST_GENDER |
| CUSTOMER | CUST_LANGUAGE_PREFERRED |
| CUSTOMER | CUST_LAST_NAME |
| CUSTOMER | CUST_MARITAL_STATUS |
| CUSTOMER | CUST_NUM_PK |
| CUSTOMER | CUST_PHONE_NUM |
| CUSTOMER | CUST_POSTAL_CODE |
| CUSTOMER | CUST_SOCIAL_SECURITY_NUM |
| CUSTOMER | CUST_STATE |
| CUSTOMER | CUST_STREET |

| FIG. 5(A) |
|---|
| FIG. 5(B) |
| FIG. 5(C) |
| FIG. 5(D) |

| LOGTABLE | LOGCOLUMN |
| --- | --- |
| ITEM | ITEM_BUYER_NUMBER |
| ITEM | ITEM_CATEGORY_NUM |
| ITEM | ITEM_COUPON_FAMILY_NUMBER |
| ITEM | ITEM_DEPOSIT |
| ITEM | ITEM_MULTIPRICING_GROUP_NUMBER |
| ITEM | ITEM_NAME |
| ITEM | ITEM_NUM_PK |
| ITEM | ITEM_ONHAND_QTY |
| ITEM | ITEM_ONORDER_QTY |
| ITEM | ITEM_PACK_QTY |
| ITEM | ITEM_PRICING_METHOD_CODE |
| ITEM | ITEM_SALES_TRAN_NUM |
| ITEM | ITEM_SHIP_SIZE |
| ITEM | ITEM_SHIP_WEIGHT_QTY |
| ITEM | ITEM_SIZE |
| ITEM | ITEM_SIZE_UNITS_OF_MEASURE |
| ITEM | ITEM_STATUS_CODE |
| ITEM | ITEM_TYPE_CODE |
| ITEM | ITEM_VALIDATION_METHOD |

FIG. 5(B)

| LOGTABLE | LOGCOLUMN |
|---|---|
| SALES_TRANSACTION | ITEM_SALES_TRAN_DATE |
| SALES_TRANSACTION | ITEM_SALES_TRAN_NET_CASH_TOT |
| SALES_TRANSACTION | ITEM_SALES_TRAN_NET_NON_CASH_TOT |
| SALES_TRANSACTION | ITEM_SALES_TRAN_RING_TIME |
| SALES_TRANSACTION | ITEM_SALES_TRAN_SEQ_NUM |
| SALES_TRANSACTION | ITEM_SALES_TRAN_TENDER_TIME |
| SALES_TRANSACTION | ITEM_SALES_TRAN_TIME |

FIG. 5(C)

| LOGTABLE | LOGCOLUMN |
|---|---|
| PAYMENTS | LAYAWAY_TRAN_PAYMENT_LINE_PK |
| PAYMENTS | PAYMENT_LINE_ACCOUNT |
| PAYMENTS | PAYMENT_LINE_AMOUNT |
| PAYMENTS | PAYMENT_LINE_BAL_DUE_AT_TENDER |
| PAYMENTS | PAYMENT_LINE_CURRENCY_TYPE |
| PAYMENTS | PAYMENT_LINE_FOREIGN_AMOUNT |
| PAYMENTS | PAYMENT_LINE_RETURN_IND |
| PAYMENTS | PAYMENT_LINE_SALES_TRAN |
| PAYMENTS | PAYMENT_LINE_SEQ_NUM |
| PAYMENTS | PAYMENT_LINE_TENDER_TYPE |
| PAYMENTS | PAYMENT_LINE_TERMS_AND_CONDITION |
| PAYMENTS | PAYMENT_LINE_VOID_IND |
| PAYMENTS | PAYMENT_TRAN_PAYMENT_LINE_PK |
| PAYMENTS | SALES_TRAN_PAYMENT_LINE_PK |

FIG. 5(D)

| PHYSTABLE | PHYSCOLUMN |
|---|---|
| CUSTOMER | COSTPOSTLCD |
| CUSTOMER | CUSTBIRTHDT |
| CUSTOMER | CUSTCITY |
| CUSTOMER | CUSTFIRSTNM |
| CUSTOMER | CUSTGENDER |
| CUSTOMER | CUSTLASTNM |
| CUSTOMER | CUSTNUM |
| CUSTOMER | CUSTPHONNUM |
| CUSTOMER | CUSTPREFLANG |
| CUSTOMER | CUSTSSN |
| CUSTOMER | CUSTSTATE |
| CUSTOMER | CUSTSTREET |

| |
|---|
| FIG. 6(A) |
| FIG. 6(B) |
| FIG. 6(C) |
| FIG. 6(D) |
| FIG. 6(E) |
| FIG. 6(F) |

| PHYSTABLE | PHYSCOLUMN |
|---|---|
| INTCUST | INTCUSTFIRSTNM |
| INTCUST | INTCUSTLASTNM |
| INTCUST | INTCUSTMARSTATUS |
| INTCUST | INTCUSTSSN |

FIG. 6(B)

| PHYSTABLE | PHYSCOLUMN |
|---|---|
| PAYMENT | ACCTNUM |
| PAYMENT | AMT |
| PAYMENT | RETURNED |
| PAYMENT | SALESTRANID |
| PAYMENT | SEQNUM |
| PAYMENT | VOIDED |

FIG. 6(C)

| PHYSTABLE | PHYSCOLUMN |
|---|---|
| TTNDR | AMT |
| TTNDR | BALDUEAMT |
| TTNDR | CURRTYPE |
| TTNDR | FOREIGNAMT |
| TTNDR | TNDRTYPE |
| TTNDR | VOIDED |

FIG. 6(D)

| PHYSTABLE | PHYSCOLUMN |
|---|---|
| ITEM | ITEMBUYRNUM |
| ITEM | ITEMCATNUM |
| ITEM | ITEMCPNFAMMEM |
| ITEM | ITEMDEPAMT |
| ITEM | ITEMMULTPRCGRP |
| ITEM | ITEMNM |
| ITEM | ITEMNUM |
| ITEM | ITEMONHAND |
| ITEM | ITEMONORDER |
| ITEM | ITEMPAKQTY |
| ITEM | ITEMPRCMETHCD |
| ITEM | ITEMSALETRANNUM |
| ITEM | ITEMSHPSIZE |
| ITEM | ITEMSHPWGT |
| ITEM | ITEMSIZE |
| ITEM | ITEMSTATUS |
| ITEM | ITEMSZUOM |
| ITEM | ITEMTYPCD |
| ITEM | ITEMVALMETHDCD |

FIG. 6(E)

| PHYSTABLE | PHYSCOLUMN |
|---|---|
| SALESTRAN | NETCASH |
| SALESTRAN | NETNONCASH |
| SALESTRAN | RINGTIME |
| SALESTRAN | TNDRTIME |
| SALESTRAN | TRANDATE |
| SALESTRAN | TRANSEQNUM |
| SALESTRAN | TRANTIME |
| SALESTRAN | TRMSCND |

FIG. 6(F)

| DATA MAPPING JOIN TABLE | | |
|---|---|---|
| LOGICAL TABLE NAME | APPLICATION IDENTIFIER | JOIN CRITERIA |
| CUSTOMER | POS | CUSTOMER.CUSTFIRSTNM= INTCUST.INTCUSTFIRSTNM |
| CUSTOMER | POS | CUSTOMER.CUSTLASTNM= INTCUST.INTCUSTLASTNM |
| CUSTOMER | POS | CUSTOMER.CUSTSSN= INTCUST.INTCUSTSSN |

FIG. 7

DATA MAPPING LOGICAL-TO-PHYSICAL TABLE

| LOGICAL TABLE NAME | LOGICAL COLUMN NAME | APPLICATION IDENTIFIER | PHYSICAL TABLE NAME | PHYSICAL COLUMN NAME |
|---|---|---|---|---|
| LOGTABLE | LOGCOLUMN | APPLICATION | PHYSTABLE | PHYSCOLUMN |
| CUSTOMER | CUST_BIRTH_DATE | CUSTNB | CUSTOMER | CUSTBIRTHDT |
| CUSTOMER | CUST_CITY | POS | CUSTOMER | CUSTCITY |
| CUSTOMER | CUST_FIRST_NAME | POS | CUSTOMER | CUSTFIRSTNM |
| CUSTOMER | CUST_FIRST_NAME | POS | INTCUST | INTCUSTFIRSTNM |
| CUSTOMER | CUST_GENDER | CUSTNB | CUSTOMER | CUSTGENDER |
| CUSTOMER | CUST_LANGUAGE_PREFERRED | CUSTNB | CUSTOMER | CUSTPREFLANG |
| CUSTOMER | CUST_LAST_NAME | POS | CUSTOMER | CUSTLASTNM |
| CUSTOMER | CUST_LAST_NAME | POS | INTCUST | INTCUSTLASTNM |
| CUSTOMER | CUST_MARITAL_STATUS | POS | INTCUST | INTCUSTMARSTATUS |
| CUSTOMER | CUST_NUM_PK | POS | CUSTOMER | CUSTNUM |
| CUSTOMER | CUST_PHONE_NUM | CUSTNB | CUSTOMER | CUSTPHONNUM |
| CUSTOMER | CUST_POSTAL_CODE | POS | CUSTOMER | CUSTPOSTLCD |
| CUSTOMER | CUST_SOCIAL_SECURITY_NUM | POS | CUSTOMER | CUSTSSN |
| CUSTOMER | CUST_SOCIAL_SECURITY_NUM | POS | INTCUST | INTCUSTSSN |
| CUSTOMER | CUST_STATE | POS | CUSTOMER | CUSTSTATE |
| CUSTOMER | CUST_STREET | POS | CUSTOMER | CUSTSTREET |
| ITEM | ITEM_BUYER_NUMBER | INVMGT | ITEM | ITEMBUYRNUM |
| ITEM | ITEM_CATEGORY_NUM | POS | ITEM | ITEMCATNUM |
| ITEM | ITEM_COUPON_FAMILY_NUMBER | POS | ITEM | ITEMCPNFAMMEM |
| ITEM | ITEM_DEPOSIT | POS | ITEM | ITEMDEPAMT |
| ITEM | ITEM_MULTIPRICING_GROUP_NUMBER | POS | ITEM | ITEMMULTPRCGRP |
| ITEM | ITEM_NAME | POS | ITEM | ITEMNM |
| ITEM | ITEM_NUM_PK | POS | ITEM | ITEMNUM |
| ITEM | ITEM_ONHAND_QTY | INVMGT | ITEM | ITEMONHAND |

FIG. 8(A)

| DATA MAPPING LOGICAL-TO-PHYSICAL TABLE ||||| 
|---|---|---|---|---|
| LOGICAL TABLE NAME | LOGICAL COLUMN NAME | APPLICATION IDENTIFIER | PHYSICAL TABLE NAME | PHYSICAL COLUMN NAME |
| LOGTABLE | LOGCOLUMN | APPLICATION | PHYSTABLE | PHYSCOLUMN |
| ITEM | ITEM_ONORDER_QTY | POS | ITEM | ITEMONORDER |
| ITEM | ITEM_PACK_QTY | INVMGT | ITEM | ITEMPAKQTY |
| ITEM | ITEM_PRICING_METHOD_CODE | POS | ITEM | ITEMPRCMETHCD |
| ITEM | ITEM_SALES_TRAN_NUM | INVMGT | ITEM | ITEMSALETRANNUM |
| ITEM | ITEM_SHIP_SIZE | INVMGT | ITEM | ITEMSHPSIZE |
| ITEM | ITEM_SHIP_WEIGHT_QTY | INVMGT | ITEM | ITEMSHPWGT |
| ITEM | ITEM_SIZE | POS | ITEM | ITEMSIZE |
| ITEM | ITEM_SIZE_UNITS_OF_MEASURE | INVMGT | ITEM | ITEMSZUOM |
| ITEM | ITEM_STATUS_CODE | INVMGT | ITEM | ITEMSTATUS |
| ITEM | ITEM_TYPE_CODE | INVMGT | ITEM | ITEMTYPCD |
| ITEM | ITEM_VALIDATION_METHOD | POS | ITEM | ITEMVALMETHDCD |
| PAYMENTS | LAYAWAY_TRAN_PAYMENT_LINE_PK | RDBFX | PAYMENT | SEQNUM |
| PAYMENTS | PAYMENT_LINE_ACCOUNT | RDBFX | PAYMENT | ACCTNUM |
| PAYMENTS | PAYMENT_LINE_AMOUNT | RDBFX | PAYMENT | AMT |
| PAYMENTS | PAYMENT_LINE_AMOUNT | RDBFX | TTNDR | AMT |
| PAYMENTS | PAYMENT_LINE_BAL_DUE_AT_TENDER | RDBFX | TTNDR | BALDUEAMT |
| PAYMENTS | PAYMENT_LINE_CURRENCY_TYPE | RDBFX | TTNDR | CURRTYPE |
| PAYMENTS | PAYMENT_LINE_FOREIGN_AMOUNT | RDBFX | TTNDR | FOREIGNAMT |
| PAYMENTS | PAYMENT_LINE_RETURN_IND | RDBFX | PAYMENT | RETURNED |
| PAYMENTS | PAYMENT_LINE_SALES_TRAN | POS | PAYMENT | SALESTRANID |
| PAYMENTS | PAYMENT_LINE_SEQ_NUM | RDBFX | PAYMENT | SEQNUM |
| PAYMENTS | PAYMENT_LINE_TENDER_TYPE | RDBFX | TTNDR | TNDRTYPE |
| PAYMENTS | PAYMENT_LINE_TERMS_AND_CONDITION | RDBFX | SALESTRAN | TRMSCND |
| PAYMENTS | PAYMENT_LINE_VOID_IND | RDBFX | PAYMENT | VOIDED |

FIG. 8(B)

DATA MAPPING LOGICAL-TO-PHYSICAL TABLE

| LOGICAL TABLE NAME | LOGICAL COLUMN NAME | APPLICATION IDENTIFIER | PHYSICAL TABLE NAME | PHYSICAL COLUMN NAME |
|---|---|---|---|---|
| LOGTABLE | LOGCOLUMN | APPLICATION | PHYSTABLE | PHYSCOLUMN |
| PAYMENTS | PAYMENT_LINE_VOID_IND | RDBFX | TTNDR | VOIDED |
| PAYMENTS | PAYMENT_TRAN_PAYMENT_LINE_PK | RDBFX | PAYMENT | SEQNUM |
| PAYMENTS | SALES_TRAN_PAYMENT_LINE_PK | RDBFX | PAYMENT | SEQNUM |
| SALES_TRANSACTION | ITEM_SALES_TRAN_DATE | POS | SALESTRAN | TRANDATE |
| SALES_TRANSACTION | ITEM_SALES_TRAN_NET_CASH_TOT | RDBFX | SALESTRAN | NETCASH |
| SALES_TRANSACTION | ITEM_SALES_TRAN_NET_NON_CASH_TOT | RDBFX | SALESTRAN | NETNONCASH |
| SALES_TRANSACTION | ITEM_SALES_TRAN_RING_TIME | RDBFX | SALESTRAN | RINGTIME |
| SALES_TRANSACTION | ITEM_SALES_TRAN_SEQ_NUM | POS | SALESTRAN | TRANSEQNUM |
| SALES_TRANSACTION | ITEM_SALES_TRAN_TENDER_TIME | RDBFX | SALESTRAN | TNDRTIME |
| SALES_TRANSACTION | ITEM_SALES_TRAN_TIME | POS | SALESTRAN | TRANTIME |

| FIG. 8(A) |
|---|
| FIG. 8(B) |
| FIG. 8(C) |

ENTITY NAME: CUSTOMER
DEFINITION: A CUSTOMER IS TYPICALLY A PERSON BUYING GOODS IN A STORE. AN EXAMPLE IS: A CUSTOMER WILL REQUEST A SALES ASSOCIATE INITIATE A SALES TRANSACTION TO PURCHASE AN ITEM FROM THE STORE.

| ATTRIBUTE NAME | ATTRIBUTES DESCRIBING CUSTOMER | | |
|---|---|---|---|
| | DESCRIPTION | INFORMATION TYPE | <MIN/MAX> |
| CUST BIRTH DATE | CUSTOMER.CUST BIRTH DATE IS THE BIRTHDATE OF THE CUSTOMER. IF THE YEAR IS INCLUDED THEN THIS IS ALSO THE CUSTOMER DATE OF BIRTH. | DATE | <1/1> |
| CUST CITY | CUSTOMER.CUST CITY INDICATES THE CITY IN WHICH THE CUSTOMER RESIDES. | CHAR(30) | <1/1> |
| CUST FIRST NAME | CUSTOMER.CUST FIRST NAME IS THE FIRST NAME OF THE CUSTOMER. | CHAR(30) | <1/1> |
| CUST GENDER | CUSTOMER.CUST GENDER IS AN INDICATOR WHICH IDENTIFIES WHETHER THE CUSTOMER IS MALE OR FEMALE. | CHAR(1) | <1/1> |
| CUST LANGUAGE PREFERRED | CUST LANGUAGE PREFERRED IDENTIFIES THE LANGUAGE OF PREFERENCE FOR THE CUSTOMER. | CHAR(30) | <1/1> |
| CUST LAST NAME | CUSTOMER.CUST LAST NAME IS THE LAST NAME OF THE CUSTOMER. | CHAR(30) | <1/1> |
| CUST MARITAL STATUS | CUST MARITAL STATUS IS THE MARITAL STATUS OF THIS CUSTOMER. | CHAR(1) | <1/1> |

| FIG. 13(A) | FIG. 13(B) |

| ATTRIBUTES DESCRIBING CUSTOMER | | | |
|---|---|---|---|
| ATTRIBUTE NAME | DESCRIPTION | INFORMATION TYPE | <MIN/MAX> |
| CUST NUM PK | CUSTOMER.CUST NUM PK IS A NUMBER WHICH UNIQUELY IDENTIFIES A CUSTOMER. | CHAR(10) | <1/1> |
| CUST PHONE NUM | CUSTOMER.CUST HOME PHONE NUM IS THE HOME PHONE NUMBER OF THE CUSTOMER. | CHAR(14) | <0/1> |
| CUST POSTAL CODE | CUSTOMER.CUST POSTAL CODE IS THE POSTAL CODE FOR THE ADDRESS AT WHICH THE CUSTOMER RESIDES. | CHAR(10) | <1/1> |
| CUST SOCIAL SECURITY NUM | CUST SOCIAL SECURITY NUMBER IS THE U.S. GOVERNMENT NUMBER USED TO IDENTIFY CITIZENS FOR TAXATION PURPOSES. IT SERVES AS AN ALTERNATE KEY FOR THE IDENTIFICATION OF CUSTOMERS. | CHAR(12) | <1/1> |
| CUST STATE | CUSTOMER.CUST STATE INDICATES THE STATE IN WHICH THE CUSTOMER CURRENTLY RESIDES. | CHAR(20) | <1/1> |
| CUST STREET | CUSTOMER.CUST STREET CONTAINS THE STREET ADDRESS AND APARTMENT NUMBER, RURAL ROUTE, OR BOX NUMBER, WHERE APPROPRIATE, AT WHICH THE CUSTOMER RESIDES. | CHAR(30) | <1/1> |

| RELATIONSHIPS BETWEEN OTHER ENTITIES AND CUSTOMER | | |
|---|---|---|
| RELATIONSHIP | <MIN/MAX> | OTHER ENTITY |
| INITIATES | <0/M> | SALES TRANSACTION |
| MAKES | <1/M> | PAYMENTS |

FIG. 13(B)

ENTITY NAME: ITEM / DEFINITION: AN ITEM IS A PRODUCT SOLD BY THE STORE.

| ATTRIBUTES DESCRIBING ITEM | | | |
|---|---|---|---|
| ATTRIBUTE NAME | DESCRIPTION | INFORMATION TYPE | <MIN/MAX> |
| ITEM BUYER NUMBER | ITEM BUYER NUMBER IS THE NUMERICAL CODE ASSOCIATED WITH THE BUYER RESPONSIBLE FOR PROCUREMENT OF THE ITEM. | INTEGER | <1/1> |
| ITEM CATE-GORY NUM | ITEM CATEGORY NUM IS THE CODE ASSIGNED TO THE CATEGORY INTO WHICH THE PARTICULAR ITEM IS CLASSIFIED. | INTEGER | <1/1> |
| ITEM COUPON FAMILY NUMBER | ITEM COUPON FAMILY NUMBER IS A UNIQUE NUMBER THAT ASSOCIATES AN ITEM WITH A COUPON FAMILY GROUP. A GENERAL COUPON FAMILY NORMALLY CONSISTS OF ALL PRODUCTS FROM THE SAME MANUFACTURER. A SPECIFIC COUPON FAMILY GROUP USUALLY CONSISTS OF SIMILAR PRO-DUCTS FROM THE SAME MANUFACTURER, SUCH AS A PARTICULAR SIZE CAN OF A PARTICULAR BRAND OF DOG FOOD. | INTEGER | <1/1> |
| ITEM DEPOSIT | ITEM DEPOSIT IS THE RETURN DEPOSIT (USUALLY FOR BOTTLES) FOR A GIVEN ITEM. | DEC(5,2) | <0/1> |
| ITEM MULTIPRICING GROUP NUMBER | ITEM MULTIPRICING GROUP NUMBER ASSOCIATES THE PRICING OF ONE ITEM TO A COMMON GROUP OF ITEMS. THIS MULTIPRICING GROUP NUMBER PERMITS A CUSTOMER TO PURCHASE ITEMS WITHIN THE SAME GROUP AS PART OF A MULTIPRICING DEAL. FOR EXAMPLE, A CUSTOMER CAN PUR-CHASE 3 CANS OF SOUP, ONE CAN OF VEGETABLE, ONE CAN OF MUSHROOM, AND ONE CAN OF CELERY. INDIVIDUALLY EACH CAN OF SOUP SELLS FOR $.34, WITH A DEAL OF 3/$1.00. BECAUSE ALL THREE CANS OF SOUP SHARE A COMMON ITEM MULTIPRICING GROUP NUMBER THE CUSTOMER WILL BE CHARGED THE DEAL PRICE OF $1.00. | INTEGER | <1/1> |

FIG. 14(A)

| ATTRIBUTE NAME | ATTRIBUTES DESCRIBING ITEM | INFORMATION TYPE | <MIN/MAX> |
|---|---|---|---|
| | DESCRIPTION | | |
| ITEM NAME | ITEM NAME IS THE TEXT STRING THAT IDENTIFIES A PARTICULAR ITEM TO THE CUSTOMER. THIS NAME CAN BE USED FOR DISPLAY AT THE CASH REGISTER, PRINTED ON THE CUSTOMER RECEIPT TAPE, OR FOR BACK OFFICE REPORTS. | CHAR(30) | <1/1> |
| ITEM NUM PK | ITEM NUM PK IS THE PRIMARY KEY FOR ITEM ENTITY. | CHAR(26) | <1/1> |
| ITEM ONHAND QTY | ITEM ONHAND QTY REPRESENTS THE ON-HAND QUANTITY FOR AN ITEM AT SOME PARTICULAR POINT IN TIME. IT DOES NOT ALWAYS REFLECT THE ACTUAL ON-HAND QUANTITY, SINCE SALES ARE NOT DEDUCTED AS THEY OCCUR. IT IS UPDATED AS ITEM MOVEMENT IS PROCESSED, OR MANUALLY THROUGH AN ONLINE SCREEN OR THROUGH A HANDHELD TERMINAL UPLOAD PROCESS. | DEC(10,2) | <1/1> |
| ITEM ONORDER QTY | ITEM ONORDER QTY IS THE NUMBER OF UNITS (CASES) OF AN ITEM ON ORDER OUTSTANDING AT A PARTICULAR POINT IN TIME. | DEC(10,2) | <1/1> |
| ITEM PACK QTY | ITEM PACK QTY IS THE NUMBER OF SELLING UNITS IN A GIVEN SHIPPING UNIT FOR A PARTICULAR ITEM. | DEC(10,2) | <1/1> |
| ITEM PRICING METHOD CODE | | INTEGER | <1/1> |

FIG. 14(B)

| ATTRIBUTES DESCRIBING ITEM | | | |
|---|---|---|---|
| ATTRIBUTE NAME | DESCRIPTION | INFORMATION TYPE | <MIN/MAX> |
| ITEM SALES TRAN NUM - ARE CONTAINED IN (FK) | ITEM SALES TRAN NUM SPECIFIES THE TRANSACTION WHICH CONTAINS THIS ITEM. | DEC(10,0) | <1/1> |
| ITEM SHIP SIZE | ITEM SIZE REPRESENTS THE PHYSICAL SIZE, IN CUBIC FEET, OF THE PARTICULAR ITEM. | DEC(10,2) | <1/1> |
| ITEM SHIP WEIGHT QTY | ITEM SHIP WEIGHT QTY IS THE SHIPPING UNIT WEIGHT OF AN ITEM EXPRESSED IN U.S. POUNDS. | DEC(10,2) | <1/1> |
| ITEM SIZE | ITEM SIZE IS THE NUMERIC VALUE DESCRIBING THE SIZE OF THE ITEM. EXAMPLES OF SIZE ARE: SMALL, REGULAR, ECONOMY, GIANT, ETC. | DEC(10,2) | <1/1> |
| ITEM SIZE UNITS OF MEASURE | ITEM.ITEM SIZE UNITS OF MEASURE SPECIFIES THE STANDARD UNIT OF MEASUREMENT USED IN DESCRIBING THE ITEM. | CHAR(4) | <1/1> |
| ITEM STATUS CODE | ITEM STATUS CODE INDICATES AVAILABILITY DISPOSITION OF A PARTICULAR ITEM. EXAMPLES OF DOMAIN VALUES MAY INCLUDE: A = ACTIVE; D = DISCONTINUED; I = INACTIVE; X = DISCONTINUE WHEN SUPPLY EXHAUSTED. | CHAR(1) | <1/1> |
| ITEM TYPE CODE | ITEM TYPE CODE SIGNIFIES WHETHER THE ITEM IS OF A "STAPLE" OR "PERISHABLE" NATURE. | CHAR(3) | <1/1> |

FIG. 14(C)

ATTRIBUTES DESCRIBING ITEM

| ATTRIBUTE NAME | DESCRIPTION | INFORMATION TYPE | <MIN/MAX> |
|---|---|---|---|
| ITEM VALIDATION METHOD | ITEM VALIDATION METHOD IS A FOREIGN KEY TO ITEM VALIDATION METHOD. | INTEGER | <1/1> |

RELATIONSHIPS BETWEEN OTHER ENTITIES AND ITEM

| RELATIONSHIP | OTHER ENTITY | <MIN/MAX> |
|---|---|---|
| ARE CONTAINED IN | SALES TRANSACTION | <1/1> |

| FIG. 14(A) |
| FIG. 14(B) |
| FIG. 14(C) |
| FIG. 14(D) |

ENTITY NAME: PAYMENTS
DEFINITION: PAYMENTS IN A RETAIL TRANSACTION REPRESENTS AN AMOUNT OF MONEY TO BE APPLIED TOWARD THE CURRENT RETAIL TRANSACTION OR TOWARD A CUSTOMER ACCOUNT. EXAMPLES: A CUSTOMER PAYS FOR A RETAIL TRANSACTION WITH A $50.00 PERSONAL CHECK. A CUSTOMER MAKES A $5.00 DEPOSIT ON A LAYAWAY ACCOUNT.

| ATTRIBUTES DESCRIBING PAYMENTS | | | |
|---|---|---|---|
| ATTRIBUTE NAME | DESCRIPTION | INFORMATION TYPE | <MIN/MAX> |
| LAYAWAY TRAN PAYMENT LINE PK - PAYMENT LINE SEQ NUM | LAYAWAY TRAN PAYMENT LINE PK IS THE UNIQUE KEY FOR PAYMENT LINE ENTITY. IT IS FORMED BY THE CONCATENATION OF PAYMENT LINE SEQ NUM AND THE FOREIGN KEY TO LAYAWAY SALES TRANSACTION. | DEC(10,0) | <1/1> |
| PAYMENT LINE ACCOUNT | PAYMENT LINE ACCOUNT IS A FOREIGN KEY TO THE ACCOUNT ENTITY. | CHAR(15) | <1/1> |
| PAYMENT LINE AMOUNT | PAYMENT LINE AMOUNT IS THE MONIES OFFERED AS PAYMENT TOWARD THE ACCUMULATED PURCHASE PRICE OF ITEMS IN AN ITEM SALES TRANSACTION, OR AS PAYMENT TOWARD A CUSTOMER ACCOUNT. THIS AMOUNT IS THE DOMESTIC CURRENCY VALUE. | DEC(10,2) | <1/1> |
| PAYMENT LINE BAL DUE AT TENDER | PAYMENT LINE BAL DUE AT TENDER IS THE ITEM SALES TRANSACTION BALANCE DUE AMOUNT AT THE TIME THIS PAYMENT LINE IS APPLIED. | DEC(10,2) | <0/1> |
| PAYMENT LINE CURRENCY TYPE | PAYMENT LINE CURRENCY TYPE IS A FOREIGN KEY TO CURRENCY TYPE. | CHAR(10) | <1/1> |
| PAYMENT LINE FOREIGN AMOUNT | PAYMENT LINE FOREIGN AMOUNT IS THE FACE VALUE AMOUNT OF THE FOREIGN CURRENCY OFFERED AS TENDER. | DEC(10,2) | <1/1> |

FIG. 15(A)

ATTRIBUTES DESCRIBING PAYMENTS

| ATTRIBUTE NAME | DESCRIPTION | INFORMATION TYPE | <MIN/MAX> |
|---|---|---|---|
| PAYMENT LINE RETURN IND | PAYMENT LINE RETURN IND IS AN INDICATOR IDENTIFYING THIS PAYMENT LINE AS PART OF A RETURN. | CHAR(1) | <1/1> |
| PAYMENT LINE SALES TRAN - PAYS FOR (FK) | PAYMENT LINE SALES TRAN SPECIFIES THE TRANSACTION IDENTIFIER FOR WHICH THIS PAYMENT IS MADE. | DEC(10,0) | <1/1> |
| PAYMENT LINE SEQ NUM | PAYMENT LINE SEQ NUM IS A SEQUENCE NUMBER THAT UNIQUELY IDENTIFIES A PAYMENT LINE WITHIN AN ITEM SALES TRANSACTION, PAYMENT TRANSACTION, OR LAYAWAY TRANSACTION. THE CUSTOMER CAN MAKE MULTIPLE PAYMENTS IN A SINGLE TRANSACTION. | DEC(10,0) | <1/1> |
| PAYMENT LINE TENDER TYPE | PAYMENT LINE TENDER TYPE IS A FOREIGN KEY TO TENDER TYPE. | DEC(10,2) | <1/1> |
| PAYMENT LINE TERMS AND CONDITION | PAYMENT LINE TERMS AND CONDITION DESCRIBES TERMS AND CONDITIONS OF THE PAYMENT. | CHAR(50) | <1/1> |
| PAYMENT LINE VOID IND | PAYMENT LINE VOID IND IS AN INDICATOR IDENTIFYING THIS PAYMENT LINE AS A VOID. FOR EXAMPLE, THE CUSTOMER OFFERS A PERSONAL CHECK TO PAY FOR A PURCHASE. STORE VALIDATION REJECTS THE STORE CHECK AND THE SALES ASSOCIATE CAN VOID THE PAYMENT LINE ASSOCIATED WITH THE CHECK. | CHAR(1) | <1/1> |

FIG. 15(B)

ATTRIBUTES DESCRIBING PAYMENTS

| ATTRIBUTE NAME | DESCRIPTION | INFORMATION TYPE | <MIN/MAX> |
|---|---|---|---|
| PAYMENT TRAN PAYMENT LINE PK - PAYMENT LINE SEQ NUM | PAYMENT TRAN PAYMENT LINE PK IS THE UNIQUE KEY FOR PAYMENT LINE ENTITY. | | <1/1> |
| SALES TRAN PAYMENT LINE PK - PAYMENT LINE SALES TRAN - PAYMENT LINE SEQ NUM | SALES TRAN PAYMENT LINE PK IS THE PRIMARY KEY FOR PAYMENT LINE ENTITY. IT IS FORMED BY THE CONCATENATION OF PAYMENT LINE SEQ NUM AND THE FOREIGN KEY TO ITEM SALES TRANSACTION. | | <1/1> |

RELATIONSHIPS BETWEEN OTHER ENTITIES AND PAYMENTS

| RELATIONSHIP | <MIN/MAX> | OTHER ENTITY |
|---|---|---|
| ARE MADE BY | <1/1> | CUSTOMER |
| PAYS FOR | <1/1> | SALES TRANSACTION |

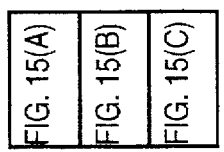

ENTITY NAME: SALES TRANSACTION
DEFINITION: SALES TRANSACTION IS A SUBTYPE OF RETAIL TRANSACTION SUPER TYPE AND INHERITS THE PRIMARY KEY AND ALL NATIVE ATTRIBUTES FROM RETAIL TRANSACTION SUPER TYPE. THIS TRANSACTION CAPTURES DATA FOR THE FOLLOWING TYPES OF ACTIVITIES: A CUSTOMER BUYS AN ITEM IN A SUPERMARKET.
  A CUSTOMER BUYS A SHIRT IN A DEPARTMENT STORE.
  A CUSTOMER RETURNS AN ITEM PREVIOUSLY PURCHASED.
  A CUSTOMER USES A CREDIT CARD TO PURCHASE ITEMS.
  A STORE MANAGER APPROVED A PRICE OVERRIDE.

| ATTRIBUTES DESCRIBING SALES TRANSACTION | | | |
|---|---|---|---|
| ATTRIBUTE NAME | DESCRIPTION | INFORMATION TYPE | <MIN/MAX> |
| ITEM SALES TRAN DATE | ITEM SALES TRAN DATE IS THE CALENDAR DATE UPON WHICH THE SALES TRANSACTION WAS EXECUTED. | DATE | <1/1> |
| ITEM SALES TRAN NET CASH TOT | THE AMOUNT OF CASH MONIES OFFERED AS PAYMENT TOWARDS AN ITEM SALES TRANSACTION. | DEC(10,2) | <1/1> |
| ITEM SALES TRAN NET NON CASH TOT | ITEM SALES TRAN NET NON CASH TOT THE TOTAL AMOUNT OF MONIES OFFERED AS PAYMENT TOWARDS AN ITEM SALES TRANSACTION OTHER THAN CASH. | DEC(10,2) | <1/1> |
| ITEM SALES TRAN PK<br>- ITEM SALES TRAN DATE<br>- ITEM SALES TRAN SEQ TIME<br>- ITEM SALES TRAN TIME | ITEM SALES TRAN PK UNIQUELY IDENTIFIES A GIVEN ITEM SALES TRAN WITHIN A GIVEN DAY. | | <1/1> |
| ITEM SALES TRAN RING TIME | ITEM SALES TRAN RING TIME IS THE AMOUNT OF TIME A SALES ASSOCIATE SPENDS SCANNING OR ENTERING ITEMS DURING AN ITEM SALES TRANSACTION. | DEC(10,2) | <1/1> |

FIG. 16(A)

| ATTRIBUTES DESCRIBING SALES TRANSACTION | | | |
|---|---|---|---|
| ATTRIBUTE NAME | DESCRIPTION | INFORMATION TYPE | <MIN/MAX> |
| ITEM SALES TRAN SEQ NUM | ITEM SALES TRAN SEQ NUM IS A UNIQUE NUMERIC IDENTIFIER WHICH IDENTIFIES THE SALES TRANSACTION BEING EXECUTED AT THE POS WORKSTATION. | DEC(10,0) | <1/1> |
| ITEM SALES TRAN TENDER TIME | ITEM SALES TRAN TENDER TIME IS THE AMOUNT OF TIME THE SALES ASSOCIATE SPENT DURING AN ITEM SALES TRANSACTION RECEIVING PAYMENT. | DEC(10,2) | <1/1> |
| ITEM SALES TRAN TIME | ITEM SALES TRAN TIME IS THE TIME OF DAY ON THE ITEM SALE TRAN DATE WHEN THIS SALES TRANSACTION WAS EXECUTED. | DEC(10,2) | <1/1> |

| RELATIONSHIPS BETWEEN OTHER ENTITIES AND PAYMENTS | | |
|---|---|---|
| RELATIONSHIP | <MIN/MAX> | OTHER ENTITY |
| CONTAIN | <O/M> | ITEM |
| PAID WITH | <O/M> | PAYMENTS |
| ARE INITIATED BY | <1/1> | CUSTOMER |

FIG. 16(B)

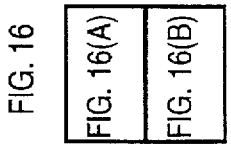

FIG. 16

| FIG. 16(A) |
|---|
| FIG. 16(B) |

METHOD AND APPARATUS FOR LOGICAL DATA ACCESS TO A PHYSICAL RELATIONAL DATABASE

BACKGROUND OF THE INVENTION

1. Field of the Invention

The present invention relates to computer database systems and in particular to access to a physical relational data base through a logical data access interface.

2. Description of the Prior Art

Many Computer Aided Software Engineering Tools have been developed that provide an application developer with the ability to create data models and process models. So called integrated CASE (or I-CASE) tools permit the developer to drive these data and process models down into applications and corresponding databases. These CASE tools support a variety of application development methodologies such as Information Engineering (IE).

However, several problems exist with these CASE tools. The Applications written or generated using a CASE tool must still be written against the physical database description (i.e., the physical database tables and table attributes). Any time the physical database description changes, Applications utilizing the changed portions must be modified to incorporate the changes. For physical tables and table attributes that are widely used throughout an enterprise system the updating of Applications using particular physical database descriptions can entail a tremendous amount of work in identifying and then properly updating the affected Applications.

Also, in any software system requiring database access, database performance is tuned and enhanced. Tuning may entail a process called normalization, which may involve splitting of tables. Database normalization is a well known technique that is used to decide what relations are needed and what their attributes should be. Normalization can enhance performance, integrity and consistency of the database. Normalization can entail taking a single relation and creating several tables. Different levels of normalization may be utilized. The level of normalization are usually called forms (i.e., first normal form, second normal form, third normal form, fourth normal form, fifth normal form and Boyce-Code Normal form).

Performance may also be enhanced by changing the physical database description to more clearly fit the manner in which the database is being utilized. For instance, if a physical table is being heavily utilized by many applications and very few of the Applications need to write to a particular column then performance may be enhanced by splitting the table into two tables one containing the primary key and column, that requires updating the other table having the primary key and all other columns. Thus, the frequently used new physical table can be read locked by multiple applications thus providing quicker access time. Thus, in analyzing the manner in which the physical tables are utilized, database performance can be enhanced. In order to enhance performance the physical structure of the database must often be changed.

As has been stated, the process of tuning a database often requires changing the physical tables and table attributes (i.e., the physical description or structure of the database). This in turn requires changes to Applications using the changed tables in order to update the Applications to reflect changes in the physical database tables. Thus, whenever the tables are modified, Applications that utilize the effected tables must be updated to reflect the changes. This is particularly a problem with Application that use the Structured Query Language (SQL) to interface an Application with a relational database.

Using SQL, only physical tables may be updated. An SQL Application must know the physical relationship between the various tables in the database utilized by the Application in order to update or access tables. Application programmers prefer to approach databases from a logical level based on the data needs of the particular Application functions. Although SQL supports schemas and views which permit an application programmer to aggregate tables, these views and schema must be constructed from a knowledge of the physical tables using SQL commands. Thus, although schemas and views permit a higher level of abstraction they still require the application to have information on the physical level (i.e., the physical description or structure of the database).

Another drawback with SQL views is that they cannot be updated directly, the underlying physical tables that are used to create the view must be updated separately when a view record requires updating (i.e., inserting a record or deleting a record). Thus, changes to the underlying physical tables still requires the application to be updated in accordance with the changed physical tables.

Updating an Application is a time consuming error prone process. Even with the advent of CASE tools, changing application code requires an analysis of what needs to be changed, how best to change it, making the changes and regression testing to ensure that the changes actually provide the expected functionality without any unexpected side effects or loss of function. Changes also require the use of computer resources which increases the cost of updating the application. Only after testing and debugging can Applications be brought on line with the updated database tables.

Although the use of CASE tools is the preferred method of creating new database Applications, most of the functionality and data an enterprise requires usually resides in existing applications and databases. Existing Applications sometimes require or expect data in a certain databases to be in certain tables with certain attributes. As databases are re-engineered these physical table structures are changed to fit into the enterprise data model. This re-engineering effort thus entails changes to the existing applications. Often the existing applications are too complex and too costly to re-engineer so they must be updated with the re-engineered data model.

Furthermore, physical database designers and maintainers are constantly faced with restructuring databases because of changing user and technical requirements. These changes can result from increased or decreased computer resources (i.e., disk, memory, processor, communications capacity), increased number of users or increased number of transactions handled by a particular database. As the enterprise adapts to changing market conditions so must the information technology system adapt to the changing needs of the enterprise. This usually entails changing the physical structure of the enterprise's databases.

Thus, whenever the physical tables of a database are changed, Applications using the physical tables must also be updated to reflect the database changes.

SUMMARY OF THE INVENTION

The present invention is directed to a method and apparatus and article of manufacture that overcome these aforementioned problems.

It is an object of the present invention to provide logical data access to a database.

It is an object of the present invention to provide logical data access to a relational database.

It is a further object of the present invention to provide for making changes to the physical structure of database tables without requiring changes to applications using the tables.

It is still a further object of the present invention to provide for application access to a database at a logical level.

It is still a further object of the present invention to allow a database administrator to tune an existing database without requiring changes in applications that utilize the database.

It is still a further object of the present invention to provide the application the ability to update views without knowing the physical table names used in constructing the view.

It is still a further object of the present invention to provide the application the ability to use logical views of a relational database without knowing the join criteria for physical tables used in constructing the views.

It is still a further object of the invention to provide for multiple applications to share common data.

It is still a further object of the present invention to isolate data access from application logic.

It is still a further object of the present invention to provide simplified database access through a uniform Application Programming Interface that makes database implementation transparent to applications and application programmers.

It is still a further object of the present invention to provide database access that makes database implementation transparent to applications and application programmers.

It is still a further object of the present invention to permit applications to view distributed data as a single logical resource.

It is yet another object of the present invention to permit fine-tuning and/or totally re-engineering of the database design for maximum performance without the need to update or modify applications.

In accordance with a preferred embodiment of the present invention is a computer system comprising one or more applications each having a logical data access interface for requesting data access in accordance with a logical data model, said logical data model having a plurality of interrelated logical entity types with each logical entity type having a plurality of logical attributes. The computer system having a relational database management system containing a plurality of physical tables, said physical tables derived from said logical data model, each of said physical tables having a plurality of columns, the database also having a logical to physical data mapping table for mapping each logical entity type and logical attribute pair to a physical table name and a physical column name as stored in the relational database management system and a join table having a join entry for each logical entity type represented by more than one physical table in the relational database management system, each join entry identifying the physical tables to join, the physical columns to join, and the join criteria necessary to form the logical entity type represented by the join entry. The computer system having a logical data access module for receiving a logical database request from a requesting application via the requesting applications's logical data interface, forming one or more database queries having physical table and physical column names using said logical to physical data mapping table and said join criteria table.

BRIEF DESCRIPTION OF THE DRAWINGS

The foregoing and other objects, aspects and advantages of the invention will be better understood from the following detailed description with reference to the drawings, in which:

FIG. 5(a) Logical Customer Table

FIG. 5(b) Logical Item Table

FIG. 5(c) Logical Sales Transaction Table

FIG. 5(d) Logical Payments Table

FIG. 6(a) Physical CUSTOMER Table

FIG. 6(b) Physical INTCUST Table

FIG. 6(c) Physical PAYMENT Table

FIG. 6(d) Physical TTNDR Table

FIG. 6(e) Physical ITEM Table

FIG. 6(f) Physical SALESTRAN

FIG. 7 Data Mapping Join Table (DMTJOIN).

FIG. 8 Data Mapping Logical to Physical Table DMTLTOP.

FIG. 13 CUSTOMER logical data model entity

FIG. 15 PAYMENTS logical data model entity

FIG. 16 SALES TRANSACTION logical data model entity

DETAILED DESCRIPTION OF THE INVENTION

Overview

Figure 1:
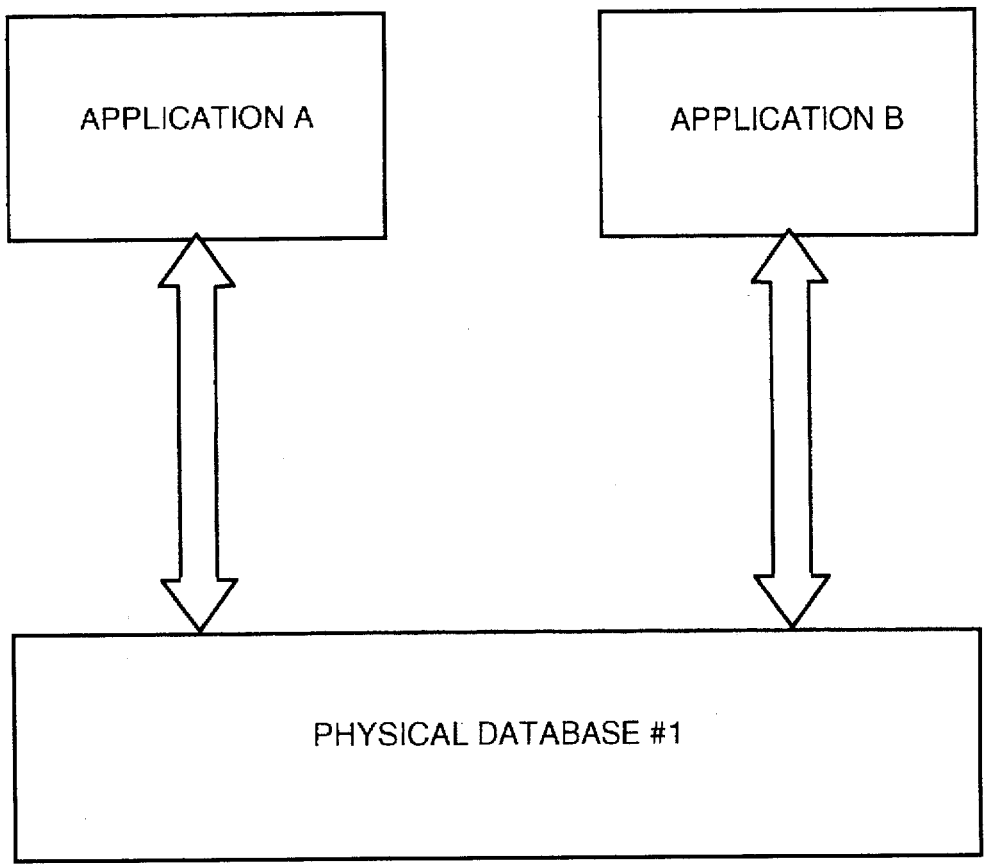
FIG. 1 Depicts a prior art system.
Figure 2:
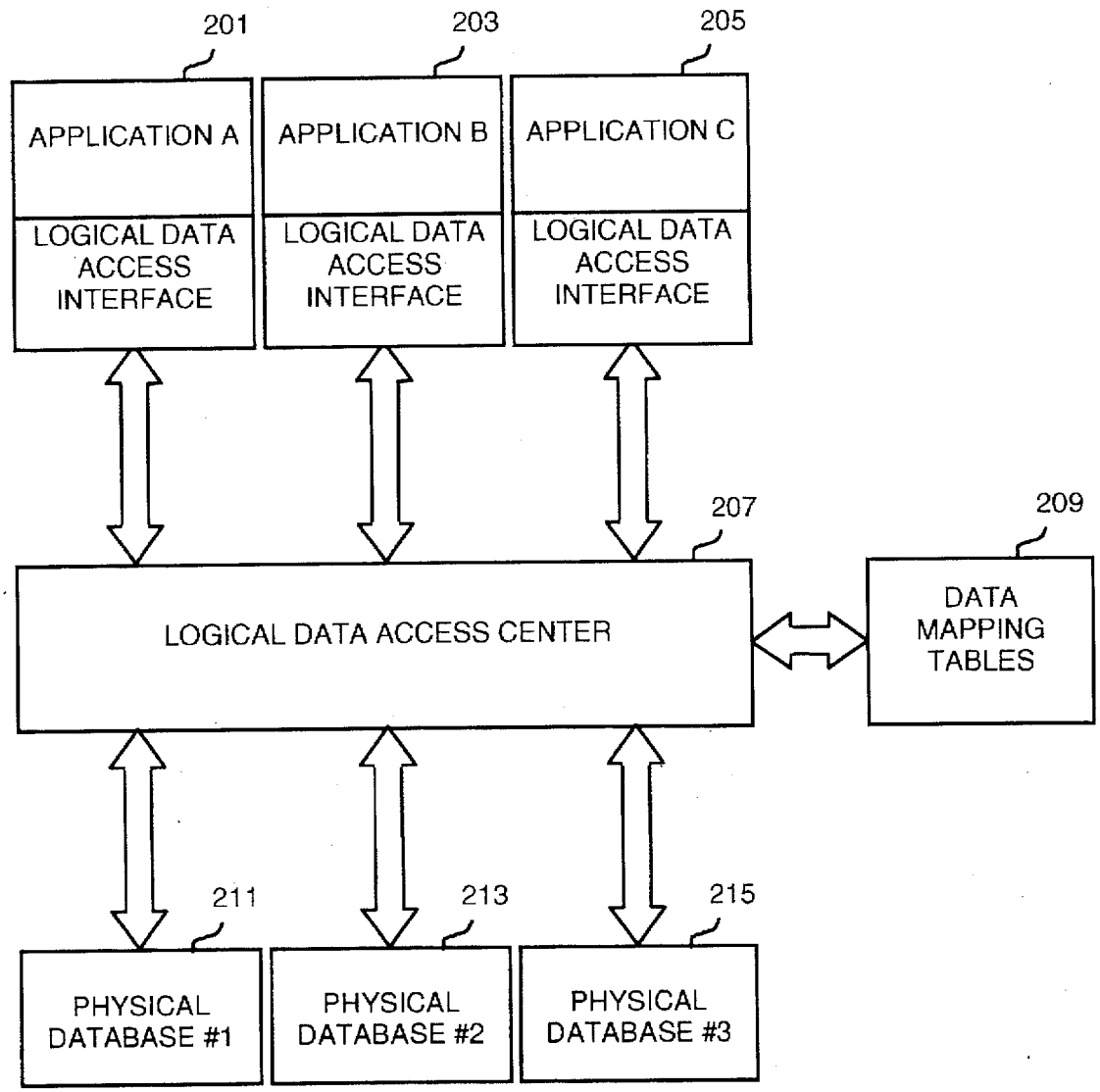
FIG. 2 is a architectural view of the present invention.
Figure 3:
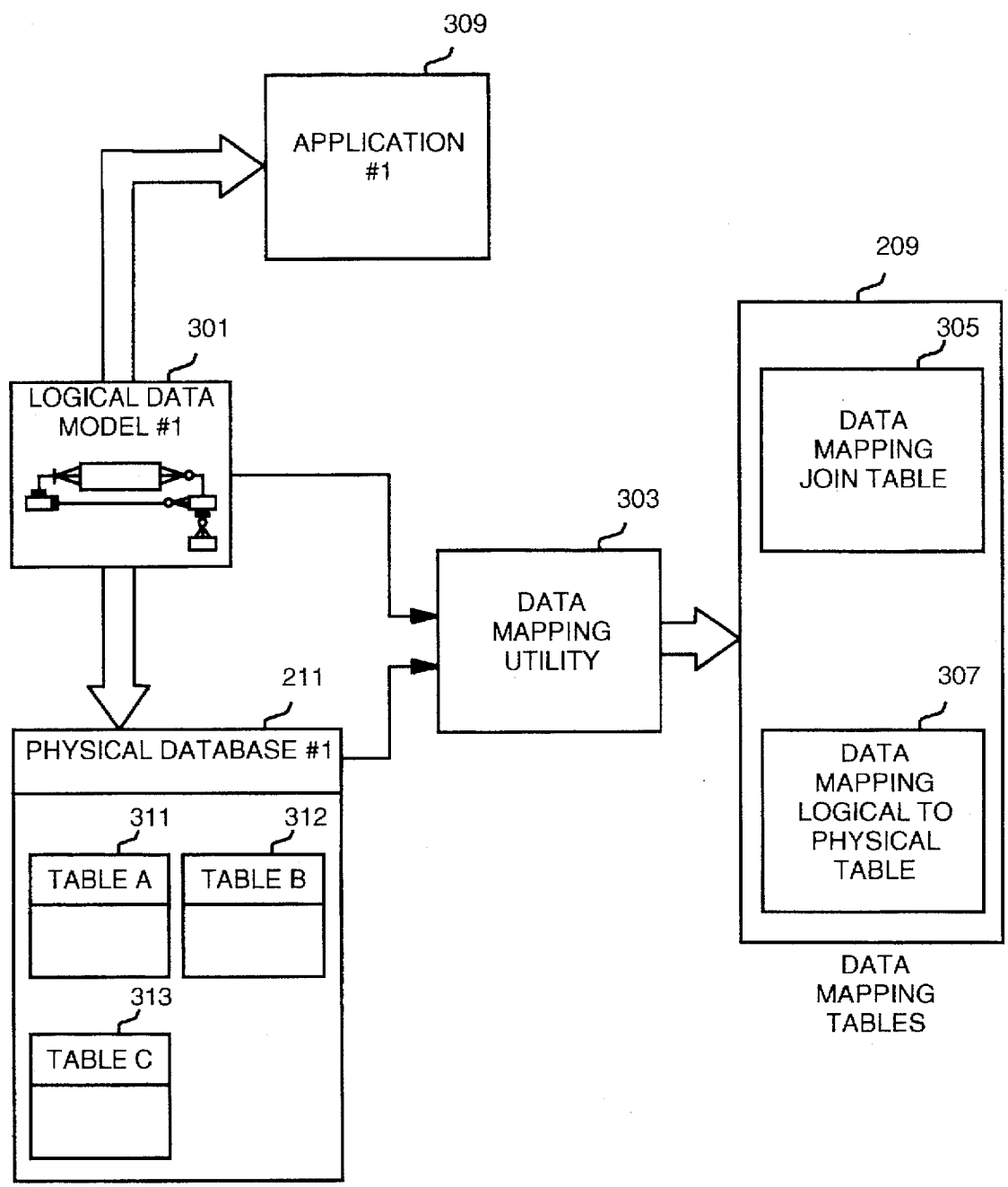
FIG. 3 depicts the creation of the data mapping tables.

FIG. 2 depicts a functional overview of the present invention as used in an operational environment, that is after development or enhancements to the databases or Applications. FIG. 3 depicts a functional overview of a development environment.

In the preferred embodiment the present invention provides Logical Data Access (LDA) to the physical structure of a relational database (RDB). Applications (201,203,205), as shown in FIG. 2 are programmed using the logical entity and attribute names as described in a logical data model. Each Application (201,203,205) may share a logical data model (i.e., an enterprise data model) or have an application specific data model. During new application development the logical data model is driven down to a physical structure or representation of the data as it is stored in a database. The Applications (201,203,205) use a Logical Data Access Interface (LDAI) to access each of the required databases via the Logical Data Access Layer (LDAL) 207. The LDAI uses logical entity and attribute names as specified in the Logical Data Model in making Logical Data Requests(LDR). The LDAL 207 provides a rich set of functions for allowing an Application to control and manage a database, build and execute database queries and interface with physical database. The LDAL 207 determines which of the physical tables, columns and attributes are required and then builds one or more SQL statements, and executes the SQL statement(s) providing any required information to the requesting Application. The LDAL 207 utilizes Data Mapping Tables 209 in order to construct the SQL query from the Applications LDR and the logical entities and attributes used in the LDR. The Data Mapping Tables 209 permit the LDAL 207 to build SQL queries with appropriate physical table and column names and to create appropriate logical entities. The LDAL 207 can then execute the SQL query against the requisite physical database causing the appropriate action such as create, read, update or delete on the database as required by the Application's LDR. The results, if any, of execution of the SQL statement are provided to the requesting Application.

FIG. 3 depicts the construction of a physical database 211 having multiple physical tables 311, 312, 313 as well as a more detailed look at the data mapping tables 209. Note that the logical data model 301 is used to construct the physical database 211. Both the Logical Data Model 301 and the Physical database structure 211 are input to a Data Mapping Utility 303 to construct the Data Mapping Tables 209. The Data Mapping tables 209 are used by the Logical Data Access Layer in SQL statement construction. The Data Mapping Utility 303 is a software system that uses input from the Logical Data Model and the physical database structure to populate the two Data Mapping tables. The Data Mapping tables 209 are shown in more detail as having a Data Mapping Join Table 305 and a Data Mapping Logical to Physical Table 307. Note that most new database applications are developed using a CASE tool. The Data Mapping Utility 303 in the preferred embodiment processes information that is exported from the CASE tool to populate the Data Mapping Tables. All of the components in FIG. 2 and FIG. 3 are described in detail below.

Logical Data Model

The Logical Data Model 301 may be created using a data modeling tool or a CASE tool. The Application Development Workbench (ADW) is such a tool and is commercially available from Sterling Software Inc. The logical data model is usually designed in conjunction with a standard design methodology. Note that design methodology for databases and database applications are described in "Methodology: The Expert Speaks" April 1989 issue of BYTE Magazine hereby incorporated by reference. The Logical Data Model of the present invention will be demonstrated using an entity relationship diagram. Data Modeling Definitions are listed in

TABLE I

Data Modeling Definitions

| TERM | DEFINITION |
|---|---|
| ENTITY | An entity is a person, place, thing or event that occurs in the real world, about which data is stored. For example, the diagram in FIG. 4 has four entities: customers, sales transactions, payments and items are all entities. |
| Fundamental | A fundamental entity exists without reference to any other entities. |
| Associative | An associative entity exists primarily to interrelate two or more entities. |
| Attribute | An Attribute entity exists to further describe a fundamental entity. |

TABLE I-continued

Data Modeling Definitions

| TERM | DEFINITION |
|---|---|
| Relationship | A relationship describes the association between two entities. From the example in FIG 4, a customer "initiates" a sales transaction. Both customer and sales transaction are entities. Initiates is the relationship between those entities. |
| Cardinality | Cardinality is the indication of the relationship between two entities. It reflects the number of instances of the first entity associated with that of the second entity. |
| Attribute | An attribute is a type of characteristic of an entity. For example, the entity customer would have such attributes as address, age, and number of family members. |
| Primay Key | The attribute or combination of attributes which uniquely identify an entity is known as the primary key for the entity. A Universal Product Code (UPC) is an example of a primary key identifying the item entity. |
| Alternate Key | The alternate key is an alternate choice of atributes which also may uniquely identify an entity instance. For example, an item may be uniquely identified by a description of the item or by the Universal Product Code (UPC) on the item. |
| Foreign Key | An attribute or combination of attributes which identifies a relationship between two entities. The foreign key of an entity must be the primay key of a related entity. Foreign keys are used for defining data insert, update and delete rules. |
| Business Rules | Business rules dictate the valid values for the attributes of an entity. Examples of business rules corresponding to the FIG. 4 and "a payment must be for a predefined sales transaction" and "a sales transaction may be made by an as yet undefined customer." Business rules preserve the integrity of the database. |
| Normalization | Normalization is a process consisting of a set of rules through which data is analysed, decomposed, and simplified to remove redundancy and to ensure consistency. Where appropriate the logical data model represents data in third normal form. A data model or database is in "third normal form" if each non-key attribute depends only on the entity primary key. |

Although there are many techniques for building entity relationship diagrams and creating logical data models and driving the logical data models down to physical database tables, the following entity relationship based technique works well with the present invention. The first step to creating a logical data model or to creating a physical database design is to develop an entity relationship diagram. In developing the entity relationship diagram the application developer identifies entity relationship types and associated attributes and also the primary key for each entity type. An entity is a thing, e.g. a person or an automobile, a concept, an organization, or an event of interest to the organization, and that which data is to be maintained. An entity type is a classification of an entity satisfying certain criteria. A relationship is an interaction between entities. A relationship type is a classification of relationships based on certain criteria. Usually, nouns in English correspond to entities, while verbs correspond to relationships. In the example shown in FIG. 4 there are four entity types: customer, payments, sales transaction and item. Also shown are several relationship types: makes, are made by, pays for, paid with, contained, are contained in, initiates, and are initiated by. Note that each relationship type has a cardinality. Cardinality is an indication of the relationship between two entities which states whether the relationship is one to one, one to many, zero to one, zero to many. Note that the cardinality is represented on the entity relationship diagram shown in FIG. 4. A line with a single slash across it indicates a one to one relationship between the entities connected by the line. A line with an inverted arrow or crow's feet on the end indicates a one to many relationship between the entities. Any line with a zero on one end of the line indicates that it is possible to have zero to one or zero to many relationships between the data entities. Thus, the markings made on the lines indicate one to one, one to many relationships that define the cardinality of the relationship between the two entities.

Note that the entity relationship diagram is read from left to right in a clockwise direction. Thus, the sample logical data model shown in FIG. 4 would be read as follows: each customer initiates zero or many sales transactions, each customer makes one or more payments to pay for one and only one sales transaction that contains zero to many items.

Figure 4:
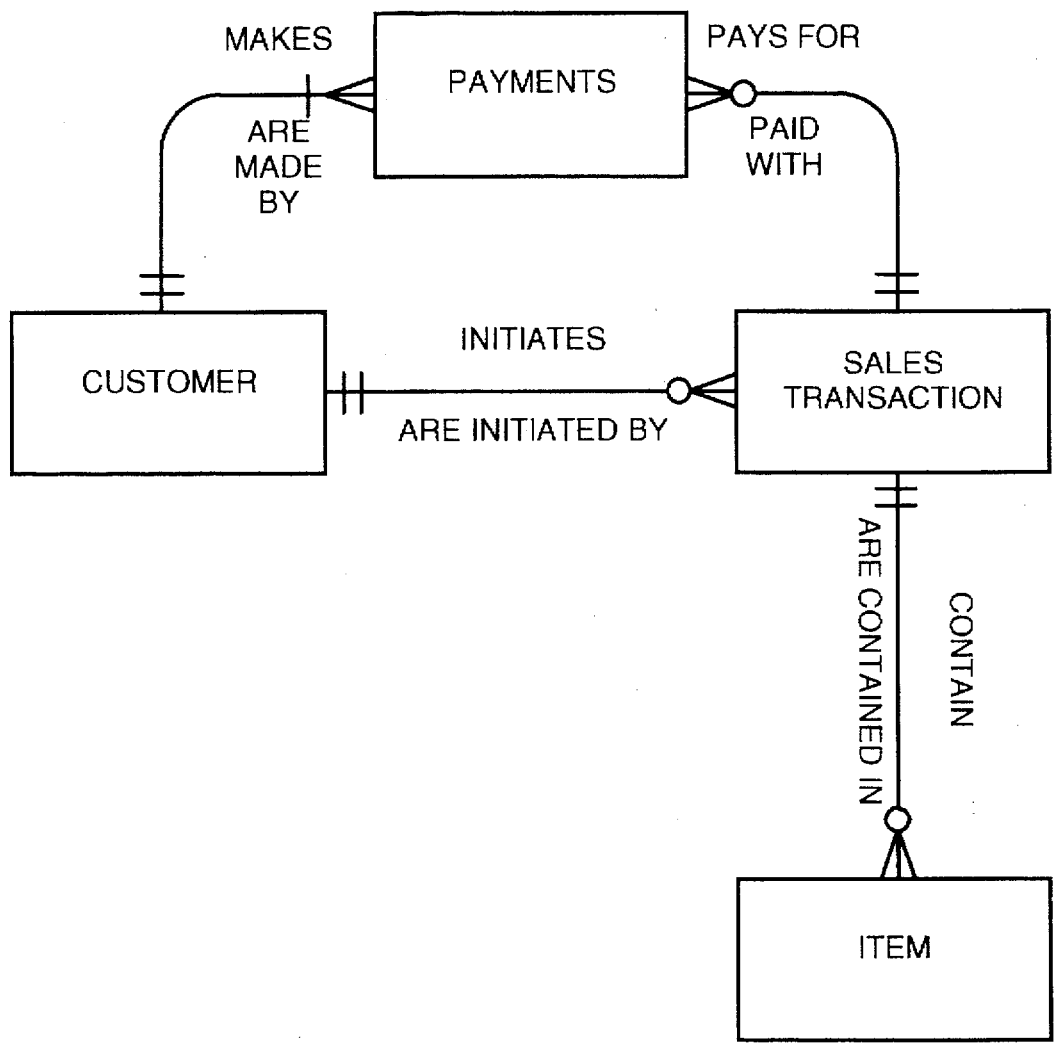
FIG. 4 Entity Relationship Diagram.
Figure 12:
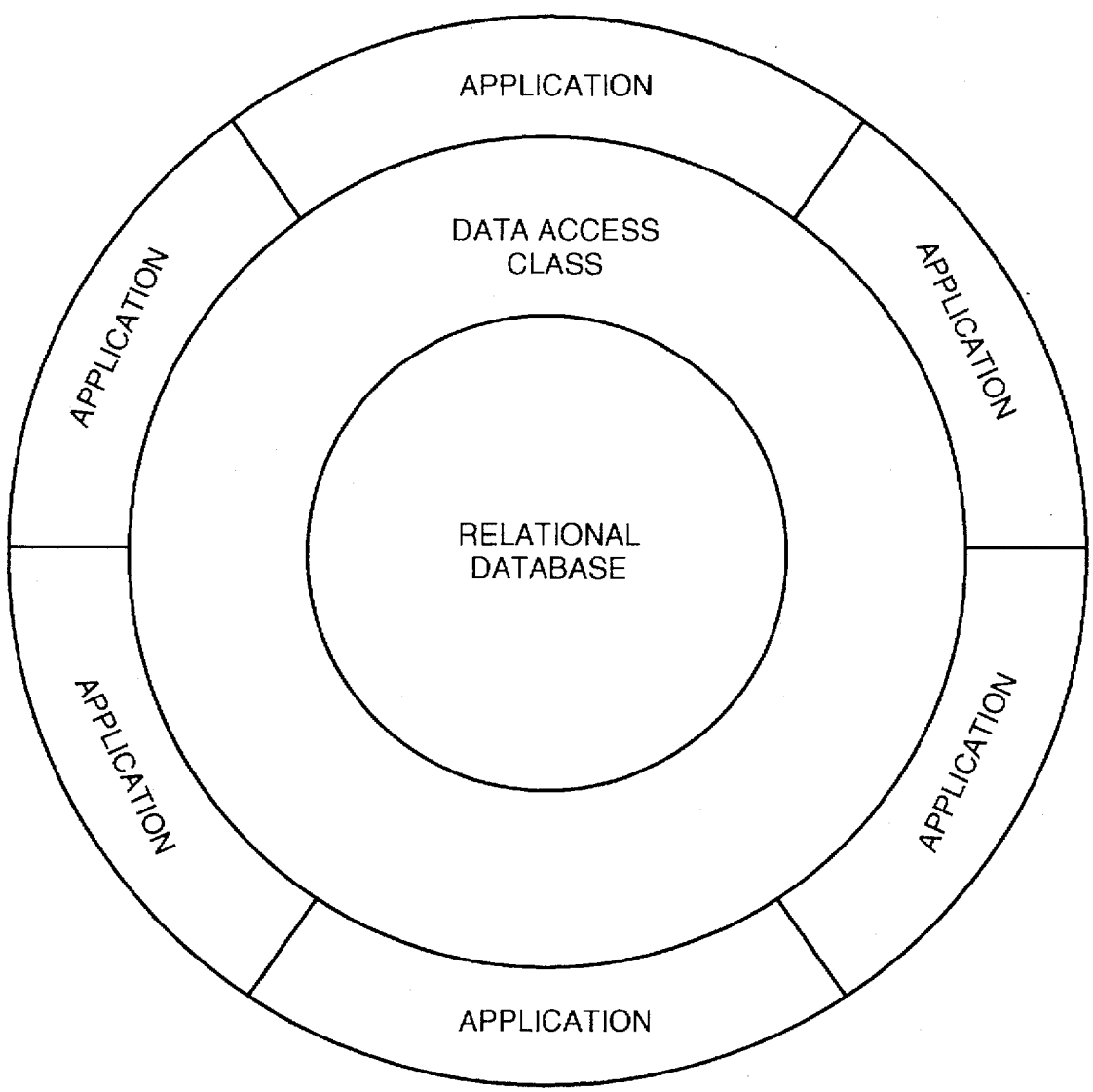
FIG. 12 A high-level view of data access class.
Figures 14, 14D:
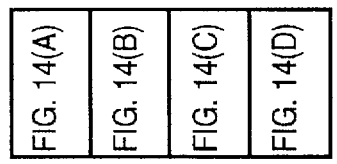
FIG. 14 ITEM logical data model entity

The next step is to convert the entity relationship diagram into a conventional file and database structures or database description language. There are many guidelines for performing this step. Typically each entity type is converted into a relation and a relationship type is converted into a standalone relation or consolidated with another relation depending on the cardinality of the relationship. Thus, from the logical data model or the entity relationship diagram it can be shown that all relations are in third normal form, that is all the primary keys of the relationships are derived automatically. The next step in using a traditional entity relationship diagraming technique would be to develop applications based on the file and database structures. Thus, having the physical database designed the developer can use a relational DBMS and write the systems query language program to express the business questions that will be asked of the database. FIG. 12 depicts the output typical of a Data Modeling Tool, and lists the attributes associated with each logical entity. Note that when the logical attribute names are generated in the logical table description as column names (see FIGS. 5a, 5b, 5c, and 5d), any attribute name that is multiple words (for example CUST MARITAL STATUS) has the blanks replaced with underscores (for example CUST_MARITAL_STATUS). The names used by the applications are the names with underscores in them. The logical level, or logical tables, for entity types shown in FIG. 4 are depicted in FIG. 5. The corresponding physical tables and columns are shown in FIG. 6.

Note that the logical view has four logical entity types (i.e., logical tables) while the physical database structure contains 6 physical tables as depicted in FIG. 6. The Customer entity type is split into two physical tables: CUSTOMER and INTCUST.

Data Mapping Tables

There are two data mapping tables utilized by the present invention: Data Mapping Logical to Physical Table and the Data Mapping Join Table. Each of these tables are described in detail below. Note also that the preferred embodiment of the present invention uses an Application name variable in the information tags, and puts the application name in the DMTs. The Application Name is not essential to providing Logical Data Access but, provides benefits in that multiple applications can easily be integrated using only one set of DMTs rather than one set per Application. Using the Application name also provides the flexibility of integrating old existing databases with new Applications using a reverse engineered Logical Data Model. Also different applications can use different Logical entity names to refer to the same physical tables. The use of the Application Identifier also provides the DBA with a quick indication of which Applications use which tables. This is helpful in database tuning as well as planning changes to the logical data model. The present invention is thus described with the use of the Application name column.

Data Mapping Logical to Physical Table (DMTLTOP) Physical Representation

The Data Mapping Logical to Physical Table permits the LDAL or Data Access Class (DAC) to map logical entities types and their associated logical attributes into physical database tables and columns. This permits each application developer with ability to name things differently while referring to the same entity. It also provides for greater portability of applications especially when the Applications are ported to use a different relational database definition. The LDAL or DAC uses the Logical to Physical mappings to get physical table names and column names from the logical specification (i.e. logical entity type and logical attributes specified in the LDR). Many databases do not provide for unlimited character length when naming tables and columns. The Logical to Physical mapping table allows the physical names to change (i.e., shortened) without impacting or causing the Application to change. When a physical name is changed all that needs to updated is the entries in the DM tables. A sample DM Logical to Physical Table is shown in FIG. 8 for the Logical Data Model shown in FIG. 5 and the Physical Database shown in FIG. 6. The DM Logical to Physical table is populating using data from the example shown in FIG. 5 and FIG. 6 and with several Applications. Each of the columns are shown in FIG. 8 and are described below.

Column 1—Logical Table Name. This corresponds to a logical table name (i.e., entity name) in the Logical Data Model. In the preferred embodiment, this is a Character field of length 32, and is a primary key to the Data Mapping Table. This field can not be NULL. Note that the Logical Table Name is shown in the LOGTABLE column of the physical table. There are four entity types shown in the DM Logical to Physical table which correspond to the four entity types shown in FIG. 4 and detailed in FIGS. 5(a)–(d) and FIGS. 13–16.

Column 2—Logical Column Name (i.e., entity type attribute or logical attribute). This corresponds to an attribute name in the logical entity type (i.e., the Logical Table Name as described above). In the preferred embodiment, this is a Character field, of length 32, and is a primary key to the Data Mapping Table. This field can not be NULL. The Logical Column Name and Logical Table Name can be used as the primary key to the DM Logical to Physical table. Note that in the preferred embodiment the primary key is a concatenation of the Application Identifier, Logical Table name, Logical Column Name and Physical Table Name.

Column 3—Application Identifier (i.e., Application name). This corresponds to the applications that utilize the logical table/logical column pair. Therefore, if this column is utilized them may be multiple applications having the same logical table logical attribute pair (the physical table and physical column names may differ). One or more applications use the logical tables. In the preferred embodiment, this is a Character field, of length 18. This field can not be NULL. Use of the Application Identifier provides the benefits discussed above.

Column 4—Physical Table Name. In the preferred embodiment, this corresponds to the physical table name in the RDB. This is a Character field, of length 18, and cannot be NULL. The maximum length of this field is constrained by the maximum length of the RDB table name in the relational database that the application uses.

Column 5—Physical Column Name. In the preferred embodiment, this corresponds to the physical column name in the Physical Table in the RDB. This is a Character field, or length 18, and cannot be NULL. The maximum length of this field is constrained by the maximum length of the RDB column name in the relational database that the application uses.

Data Mapping Join Table (DMTJOIN) Physical Representation

The DMTJOIN Table specifies the physical tables that are used in creating the logical entity type and logical attributes (or SQL views) for the requesting Application. The DMTJOIN Table is used by the Data Access Class (DAC) to determine what tables are to be joined and the conditions under which they are joined. The join criteria is also used to determine how each table is to be updated when the requesting Application requests an update to the logical entity. Thus, the Application is completely isolated from the physical structure of the database. The DAC uses the DMTJOIN table to create SQL views and then to determine the update required of these tables underlying these views when the Application specifies an update in a LDR. A sample DMTJOIN is shown in FIG. 8 for the Logical Data Model shown in FIG. 5 and the Physical Database shown in FIG. 6. Each of the columns are described below.

Column 1—Logical Table Name. In the preferred embodiment, this corresponds to a logical table name in the Logical Data Model. This is a Character field, of length 32, and is a primary key to the Data Mapping Table. In the preferred embodiment the primary key is the Logical Table Name concatenated with the Application Identifier. This field can not be NULL.

Column 2—Application Identifier. In the preferred embodiment, this corresponds to the Applications that utilize the logical table. One or more applications may use the same logical entity type name but have different logical entity type attributes and different join criteria. This is a Character field, of length 18, and is used as part of the primary key in the preferred embodiment. This field can not be NULL.

Column 3—Join Criteria. In the preferred embodiment, this corresponds to the join criteria between physical tables in the RDB that were generated as a result of splitting a logical table in the Logical Data Model into 2 or more physical tables in the physical RDB. Any logical entity type (i.e., logical table) that consists of more then one physical table has an entry (or more then one entry) in the DM Join table. It is a Character field, of maximum length 1000. The Join Criteria identifies the physical tables that the Logical entity type is made from and the criteria under which the tables are joined (i.e., the columns and the criteria under which data in the columns are to be joined). For example: T1.C1.EQ.T2.C2,T1.C2.NE.T3.C3 would be interpreted as (T1.C1 EQ T2.C2) AND (T1.C2 NE T3.C3) where T1, T2, and T3. are physical table names, and C1, C2, and C3 are physical column names within those tables, respectively. If multiple columns need to be joined, then the format above can be repeated with a comma separating the join conditions or alternatively multiple entries can be made in the DM join table for each of the conditions to be ANDed together. The comma or multiple DM join entries implies an AND relationship between the join conditions. In FIG. 7 the logical entity type Customer is shown as three entries. Each of the entries are anded together such that the physical table CUSTOMER and INTCUST are joined together where the CUSTOMER.CUSTFIRSTNM = INTCUST.INTCUSTFIRSTNM and CSTOMER.CUSTLASTNM = INTCUST.INTCUSTLASTNM and CUSTOMER.CUSTSSN=INTCUST.INTCUSTSSN. Thus the two tables are joined where the first name, last name and social security number of the respective physical tables are the same.

Application Physical Tables

The physical tables 311 are the tables created from the Logical Data Model 301. These are the actual application tables described in the Logical Data Model, in their physical form. These tables are shown for a sample POS Application in FIG. 6. They are created from the Data Definition Language (DDL) generated by the CASE tool, or generated by the Application Developer or the Data Modeler. The DDL defines the physical structure of the tables such as the table name, column names and data types for each column. These tables are application or enterprise specific in that their content is dictated by the needs of the Applications that utilize the tables. These tables are populated by Applications or data conversion programs. The application tables reside in the physical relational database 211. Although shown separately in FIG. 3, the physical relational database includes the Data Mapping Tables (DMT) 209 (i.e., Data Mapping Join Table (DMTJOIN) 305 and the Data Mapping Logical to Physical Table 307) along with the Applications Physical Tables 311.

Application

The Application #1 309 is a computer program written like any other program, with the exception that this program uses the Logical Data Access Interface to access data in the relational database. The LDAI permits the Application to build database queries using only the Logical Data Model Specification. In the preferred embodiment the LDAI is a Data Access Class which permits the Application to create/read/write/delete data from a relational database. The Application uses the Logical Entity Types and the Logical Entity Type attributes from the logical data model in the specification of data in the database. The Application thus specifies the data it desires using logical tables and logical table attributes. The Application does not require any knowledge of the physical database structure. The Application is isolated from the physical structure of the database. Changes to the physical structure do not require changes to the Application.

In the preferred embodiment, the Application is written in C++, but can be written in any programing language. Although any database language may be utilized with the present invention the preferred database language is SQL and in particular dynamic SQL. Dynamic SQL consists of a set of embedded SQL facilities that are provided to allow construction of generalized online Applications. Dynamic SQL allows the Applications the ability to construct necessary SQL statements dynamically and then to bind and execute those constructed statements dynamically, instead of hardcoding SQL for every possible command. The facilities of dynamic SQL are provided to assist this process. The two principle dynamic statements are PREPARE and EXECUTE. Additional information on Dynamic SQL can be found in the following reference: A Guide to DB2 (3rd Edition) by C. J. Date and Colin J. White hereby incorporated by reference.

In the preferred embodiments logical data requests are made via the Data Access Class (DAC). See FIG. 12. Applications build database queries by executing one or more methods in the DAC. The DAC provides a rich set of functions for building and executing database queries as well as controlling the DBMS.

One important Logical Data Request or command available to the Application via the LDAI is the setItemList function. Logical Items are specified with the setItemList method. This method determines the physical table name and column names within those tables. For example, to select logical columns col1, and col2 from logical table A, the setItemList method is called with the following signature:

setItemList(appl.A.col1, appl.A.col2);

To build a Dynamic SQL select statement, the application program would then use the buildSelectStmt method, and a physical SQL select statement is returned. All application requests are at the logical level. The Data Access Class returns SQL statements that are at the physical level based on the logical level specification. These returned statements can then be executed using dynamic SQL, and the data is returned in the dynamic SQL data area (SQLDA). Dynamic SQL and the SQLDA are standard components of any Relational Database system that supports SQL. The DB2 relational data base management system is commercially available from IBM. The Data Access Class may also use the Call Level Interface (CLI) or the ODBC interface or any other dynamic database interface language instead of Dynamic SQL.

Sample code for an Application that uses the Data Access Class is provided in the Example of Operation Section.

Data Access Class(DAC)

The Data Access Class determines which physical table names and physical columns to use in a database query, and the SQL commands required to provide the logical information specified by the Application. The Data Access Class (DAC) is a C++ class that provides Applications access to the physical relational database, and isolates the application from the details of using a RDB. While this DAC is illustrated using C++ the present invention does not require the use of C++ and can be implemented using any programming language.

The DAC implements or carries out the Logical Data Requests or commands or methods from the Application. An Application specifies the logical level data using the following DAC methods setItemList, setSearchCondition, setGroupBy, setHaving, and setOrderBy methods. Each of these methods uses the same basic technique. These methods (object oriented methods look like function calls, but have access to the same data within a class) parse the input string to determine: the logical application name, logical table name, and logical column name. Having obtained the requisite information, a database lookup in the DM Logical to Physical table is used to determine the physical table and column name(s) to use. Each logical table and logical column pair is mapped to one or more physical table and physical column names. The Logical Table name is also used to perform a database lookup against the DM join table. If there are entries in the Join table for the logical table name then the logical table name is composed of multiple physical tables. The join criteria is then obtained for the logical table name if any. The join criteria is then used to construct the logical view.

Having performed the Joins and obtained the Logical to Physical mappings the SQL statements are built using the ANSI standard SQL syntax (for example SELECT columname 1, columnname2 FROM tablename WHERE columnname3=5). ANSI standard SQL is defined in ANSI (American National Standards Institute) X3.135–1992, Database Language SQL hereby incorporated by reference. Note that any SQL or database language can be supported including IBM's SQL Standard defined in IBM Database 2 SQL Reference, IBM Document No.: SC26-4890 hereby incorporated by reference. The built SQL statements may be returned to the requesting Application. The requesting Application may prepare the generated SQL statements for execution and execute the prepared statements as the Application would for any dynamic SQL statement. In the preferred embodiment all database access commands are handled by the DAC. Thus, the Application requests that the DAC prepare and execute the SQL statements built by the DAC.

The DAC performs dynamic execution of the prepared SQL statements when requested by the Application. Execution is done at the physical level using dynamic SQL. Results are returned in the dynamic SQL data area. The return of results to SQLDA is a standard component of most commercial database systems that support SQL.

A fully functional DAC isolates the Application from any database specific commands. This provides for fuller portability and simplifies the Applications interfaces to RDB systems. A fully functional interface may make the following methods (or functions or commands) available to Applications:

1. Constructor—creates an instance of the DAC.
2. Destructor—deletes an instance of the DAC.
3. Start—start the database manager
4. Stop—stop the database manager
5. Open—connect to a database
6. Disconnect—disconnect from a database
7. executeUsing—execute a prepared Statement using the dynamic access area (SQLDA). This method is invoked by an application to execute a dynamic SQL statement where values are passed with parameters—for example—an SQL statement like "Select * from Customer where CUSTCITY='Baltimore' would require an SQLDA with the value of 'Baltimore' in it.
8. ExecuteImmediate—SQL pass-thru capability. This method is invoked by an application to execute dynamic SQL statements that do not require data to be input, or expect data to be returned. For example, the SQL statement DELETE FROM CUSTOMER does not require any input parameters (since there is no constraint on the data) nor is there data returned.
9. lockTable—lock an RDB table in exclusive mode. This method is invoked by an application when the application wants to prevent other applications from reading or writing a table.
10. fetch—fetch a results row into a SQLDA. This method is invoked by an application when the application is retrieving multiple rows from a database query. This method is invoked after a dynamic SQL statement has been described and prepared, and a cursor created and opened, and is usually used within a loop in the application. When a non-zero return code is received from this method, then the application knows that it has retrieved all rows of data that are applicable to the select statement. This method is only applicable for READING data from the RDB.
11. describe—describe an SQL statement into a SQLDA. The describe method is invoked by an application so the database manager can get information about a statement that has been prepared. It is utilized by the Data Access Class to get the number of variables, as well as the variable types that apply to the statement.

12. prepare—prepare an SQL statement for execution. This method is invoked to create an executable form of an SQL statement from a character-string form of the statement.

13. commit—commit all data changes in this logical unit of work. This method is invoked when an application wants to end a unit of work, and commit the database changes that were made by the unit of work.

14. rollback—rollback all data changes in this logical unit of work. This method is invoked when an applications wants to end a unit of work and back out the database changes that were made in that unit of work.

15. setUpSQLDA—create a SQLDA. This method is invoked when an application needs to pass data into an SQL statement, or read the data results of an SQL query.

16. putVarIntoSQLDA—places a data value in the SQLDA. This method is invoked by an application to put data into the SQLDA that was created by the setUpSQLDA method. The application uses the logical variable name in the signature for this method, along with a pointer to where the data exists that must be put into the SQLDA. The implementation of the method determines which position in the SQLDA should be populated with the data, and copies the data into that position in the SQLDA.

17. getVarFromSQLDA—retrieves a data value from the SQLDA. This method is invoked by the application to retrieve a data value returned from an SQL query. The application uses the logical variable name in the signature for this method, along with an address of where to place the data. The address of the data is typecast to the data type (for example integer, or long). The implementation of the method determines which position in the SQLDA the data is in, and returns that data into the address of the data item that was in the methods signature.

18. putVarIntoSearchCondition—places a data value in the search condition section of the SQLDA. This method is similar to the putVarIntoSQLDA method, in that the implementation of the method takes a data value and places it into the SQLDA, based on the logical name. However, since the position in the SQLDA can vary depending on table splits, this method is used to specify data values that are only used in search conditions (SQL WHERE clause).

19. putVarIntoHavingCondition—places a data value in the having condition section of the SQLDA. This method is similar to the putVarIntoSQLDA method, in that the implementation of the method takes a data value and places it into the SQLDA, based on the logical name. However, since the position in the SQLDA can vary depending on table splits, this method is used to specify data values that are only used in search conditions (SQL WHERE clause).

20. logon—log on to a database 21. logoff—logoff a database 22. reset—resets all fields in an SQL statement to NULL. This method is used for cleanup of pointers in the Data Access Class.

23. setItemList—set the columns to be used in a query, update, or insert statement. This method is used by an application to specify the logical tables and columns to be used in the SQL query. The implementation of the method requires a lookup of the logical names in the DMT to determine the physical names to use, and join criteria if the tables have been split.

24. setSearchCondition—set the constraints for a SQL statement. This method is invoked by an application when a statement requires a search condition (i.e. a WHERE clause). The application will specify the search condition using the logical names, and the implementation of the method will determine the physical names to use, as well as if the search condition should be broken up into multiple search conditions. This breakup of the search condition may occurs when a logical table has been split into multiple physical tables. The implementation must parse the search condition into subconditions that apply to the physical tables, as a search condition for inserts, updates, and deletes can not span multiple physical tables.

25. setGroupBy—set the group by criteria for a query. This method is invoked by an application when a statement requires data to be grouped in a certain order. In each group of more than one row, all values of each grouping column are equal, and all rows with the same set of values of the grouping columns are in the same group. The application will specify the group columns using the logical names, and the implementation of the method will determine the physical names to use.

26. setHaving—set additional constraints for a SQL statement This method is invoked by an application when a statement requires an intermediate result table that consists of groups of data that meet the constraint specified in the setHaving method. The same processing required for setSearchCondition is invoked in the implementation of this method to determine the having constraint for split logical tables. Logical names are used in the input to this method to specify the constraint, exactly like the setSearchCondition method.

27. setAllDistinct—set duplication constraints for a query. This method is invoked by an application when the application does not want to receive duplicate rows for search conditions. For example, if the application wants to retrieve all the cities that exist in the customer database, the application would build a SELECT DISTINCT CUSTCITY FROM CUSTOMER statement. The application would then not have to worry about duplicate cities being returned.

28. buildSelectStmt—build the SQL select statement. This method is invoked by an application after it has told the data access class which items it wants to read from the database (using the setItemList method with logical names), and specified any constraints on the search of the database (using the setSearchCondition method). This method will return a SQL statement that is built with the physical table and columns names. This statement can then be executed via the executeUsing method of the Data Access Class.

29. buildDeleteStmt—build the SQL delete statement. This method is invoked by an application after it has told the data access class which items it wants to delete from the database (using the setItemList method with logical names), and specified the constraints on the search of the database (using the setSearchCondition method). The implementation of this method will build one or more SQL DELETE statements, based on whether the logical table is split into multiple physical tables. The application will then ask for the number of tables via the getNumTables method, and get an SQL delete statement for each physical table that exists, via the getDeleteStmt method. The application will then execute the delete statements it got via the executeUsing method of the data access class.

30. buildUpdateStmt—build the SQL update statement. This method is invoked by an application after it has told the data access class which items it wants to update in the database (using the setItemList method with logical names), and specified the constraints on the update of the database (using the setSearchCondition method). The implementation of this method will build one or more SQL UPDATE statements, based on whether the logical table is split into multiple physical tables. The application will then ask for the number of tables via the getNumTables method, and get an SQL update statement for each physical table that exists, via the getUpdateStmt method. The application will then execute the update statements it got via the executeUsing method of the data access class.

31. buildInsertStmt—build the SQL insert statement This method is invoked by an application after it has told the data access class which items it wants to insert in the database (using the setItemList method with logical names), and specified the constraints on the insert of the database (using the setSearchCondition method). The implementation of this method will build one or more SQL INSERT statements, based on whether the logical table is split into multiple physical tables. The application will then ask for the number of tables via the getNumTables method, and get an SQL insert statement for each physical table that exists, via the getInsertStmt method. The application will then execute the insert statements it got via the executeUsing method of the data access class.

32. getDeleteStmt—return the SQL delete statement. The application will invoke this method to get a delete statement from the Data Access Class. The buildDeleteStmt method must be invoked prior to this method. The signature for this method requires a table number. This method will return a physical SQL delete statement that applies for the table specified in the invocation of the method. Prior to invoking this method, the application should invoke the getNumTables method to determine the number of physical tables that are being deleted based on the logical table name that was specified in the setItemList method.

33. getUpdateStmt—return the SQL update statement. The application will invoke this method to get an update statement from the Data Access Class. The buildUpdateStmt method must be invoked prior to this method. The signature for this method requires a table number. This method will return a physical SQL update statement that applies to the table specified in the invocation of the method. Prior to invoking this method, the application should invoke the getNumTables method to determine the number of physical tables that are being updated based on the logical table name that was specified in the setItemList method.

34. getInsertStmt—return the SQL insert statement The application will invoke this method to get an insert statement from the Data Access Class. The buildInsertStmt method must be invoked prior to this method. The signature for this method requires a table number. This method will return a physical SQL insert statement that applies to the table specified in the invocation of the method. Prior to invoking this method, the application should invoke the getNumTables method to determine the number of physical tables that are being updated based on the logical table name that was specified in the setItemList method.

35. getNumTables—return the number of physical tables used in the SQL statements. This method is invoked by an application after the setItemList, setSearchCondition, setGroupBy, and setHaving methods are invoked (not all of these methods need be invoked). After the aforementioned methods are invoked, the Data Access Class knows how many physical tables are affected by the logical table specified in the aforementioned methods. The application needs to know how many physical tables are specified, so the application knows how many physical SQL statements to retrieve from the data access class (via the getDeleteStmt, getUpdateStmt, and getInsertStmt methods). Regardless of the number of physical tables, there is only one Select statement generated, because SQL allows the join of tables in a select statement.

In the preferred embodiment the DAC has the full functionality described above, the following five methods are essential for logical data access, in that the data required or desired by the Application can be specified in accordance with the Logical Data Model.
1. setItemList
2. setSearchCondition
3. setGroupBy
4. setHaving
5. lockTable The above listed methods require the Application to use the logical entity and logical entity attribute names in order to obtain logical data access. The implementation of the methods determines the physical tables and columns to use by reading all DM Logical to Physical table entries for the logical entity, attribute, and application name. When the application executes the (for example) buildSelectStmt method, the SQL Select Statement that is built will have the correct physical table(s) and column(s) names in it. In addition, if the logical entity was split into multiple physical tables in the RDB (often done for performance reasons), the join criteria between the physical tables will be added in by the Data Access Layer. This is done by reading all the DMTJOIN entries for the logical entity and application name, and appending the join criteria to any other join criteria specified by the application. The DAC parses each of the arguments supplied in each of the five methods. The DAC then uses each argument and performs a table lookup using the DM Logical to Physical table to obtain the physical tables and column names. The DAC then utilizes the DM Join criteria table to determine if any Logical entity consists of more then one table. If a logical entity is split into one or more physical tables, the DAC gets the physical table names and the join criteria and uses this information to create database statements necessary to create a logical entity type. The logical entity type can then be accessed as if it were a physical table by the Application. If a logical entity type must be updated then the DAC determines the SQL statements that must be generated based on the Join criteria and the request and generates the appropriate update statements for each of the physical tables used in the view as required by the update request. The processing of Logical data requests containing Logical data specifications is shown in FIG. 9.

Figure 9:
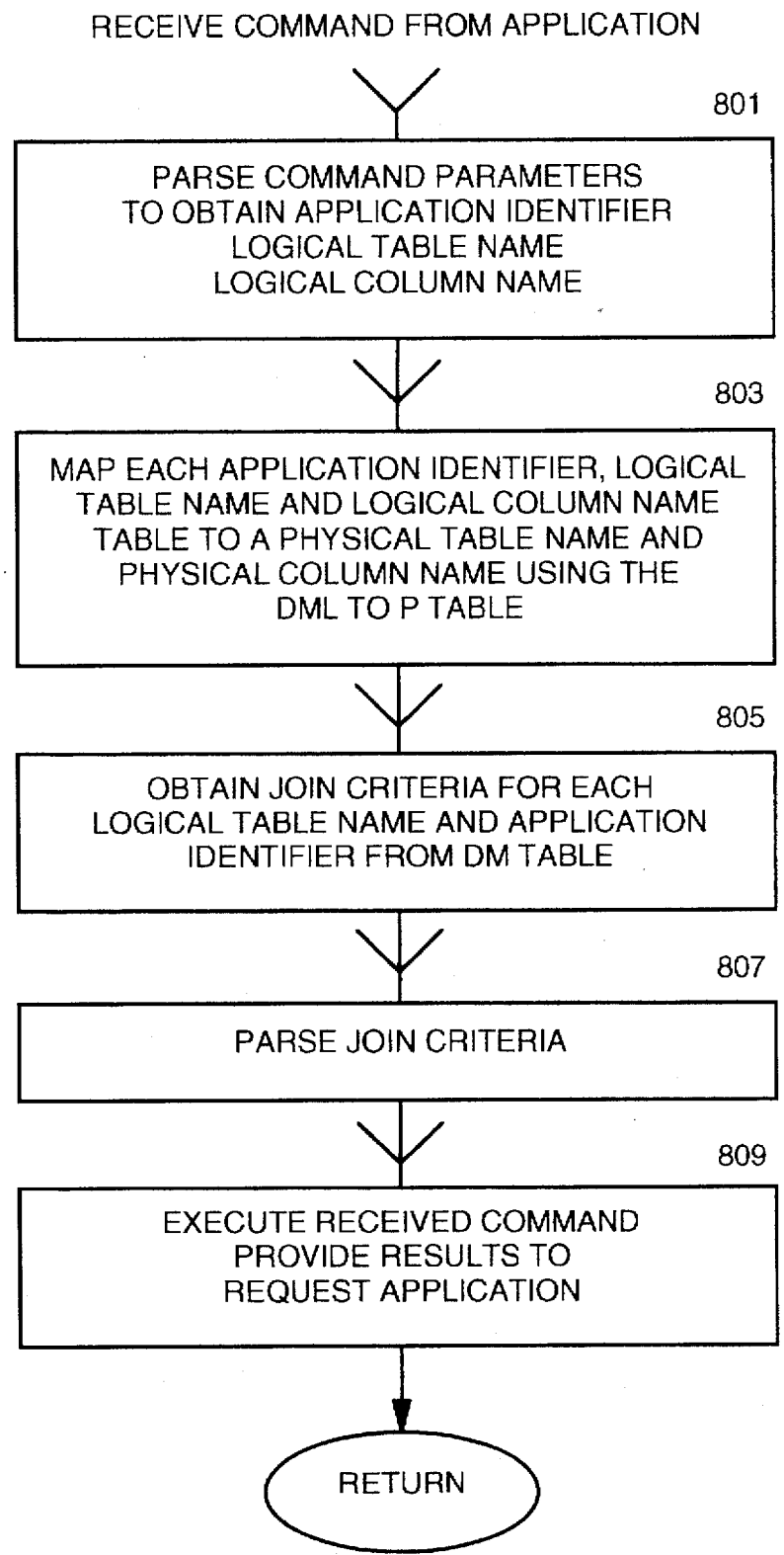
FIG. 9 Method of providing logical data access.

In FIG. 9 a command is received from an Application by the DAC. In step 801 the DAC parses the command parameters to obtain any Application Identifier, Logical Table Name and Logical Column name tuples embedded in the command parameters. In step 803 the DAC Maps the obtained Application Identifier, Logical Table Name, and Logical Column Name tuple to obtain a Physical Table Name and a Physical Column Name pair. This Logical to Physical mapping is accomplished using the DM Logical to Physical table. In the preferred embodiment this mapping is accomplished using an SQL select statement with the appropriate search terms. For instance, the following select statement can be used:

```
SELECT DMTLTOP.PHYSTABLE, DMTLTOP.PHYSCOLUMN
    FROM DMTLTOP WHERE
((DMTLTOP.LOGTABLE=LOGICAL_TABLE_NAME)
    AND (DMTLTOP.LOGCOLUMN=LOGICAL_COLUMN_NAME
    AND (DMTLTOP.APPLICATION=APPLICATION_IDENTIFIER))
```

The Logical to Physical table may contain multiple entries for each of the tuples. In step 805, each obtained Application Identifier and Logical table name pair is used to determine the join criteria if any for the pair. Each Application Identifier and Logical Table Name pair may have more then one entry in the DMTJOIN table as described previously. The entries will be ANDED together if more then one exists. The join criteria obtained from the DMTJOIN table is then parsed to obtain the physical table names that are to be joined and the physical column names in the respective physical table names on which to join the tables and the join conditions. The parsing of the join criteria is shown in step 807. The parsed join criteria items can then be used to form an SQL statement suitable for creating a view or an SQL join statement. If an Update SQL statement is being built then the parsed join criteria items along with the mapped physical table names and physical column names and command parameters are utilized to construct appropriate SQL statements to update the necessary physical tables. In step 809 the received command is executed and the results, if any, are provided to the requesting Application (i.e., the Application issuing the command). Note that one or more commands may need to be issued in order to build the required SQL statements necessary to accomplish the Applications desired data access. Steps 801 through 807 are performed whenever command parameters contain a logical data specification. Examples of Application code necessary to build and execute queries are shown in the Example of Operation section provided below.

If a Logical Data request specifies that a Logical Entity Type (i.e., logical table) is to be updated then the join criteria for the logical table is utilized to determine which entries in each of the requisite physical tables joined to provide the logical table need to be updated. Updating can result in the insert/deletion/modification of records in one or more of the physical tables joined to form the logical table. The Application does not have to determine which of the physical tables used in the logical table are to updated. The DAC uses the join criteria and the Logical to Physical mapping of the LDR specification to determine which tables are updated and to build the SQL statements required to update the physical tables as required.

The DAC response to Application requests is described in examples provided in the Examples of Operation section. Note that in the preferred embodiment the DMTs are located in the DBMS with the Application tables. In accessing the DMTs (i.e., the DM Logical to Physical Table and the DM Join Table) the DAC may utilize the interface language associated with the DBMS in which the DMTs are stored. Thus, the DAC may use SQL to access required information from the DMTs.

The DAC provides Data-type independence. The DAC does not manage the data types of the columns. The database manager has knowledge of the data types for all columns, and whenever the DAC needs to know the type of data (for example the DAC needs to know how much space to allocate when reading a column from the database), the DAC asks the database manager for the column type and length information. This type information can be provided to the Application(s) as well.

The DAC provides several benefits. First, the DAC hides the details of the Structured Query Language from the applications, thereby providing greater application portability and makes Application development less tedious and thus less prone to error.

Second, the Data Access Class utilizes each of the Data Mapping Table(s) to generate SQL statements that accept logical table and logical column names as input, and executes SQL with the physical table names and physical column names, as well as any additional join criteria that may apply due to the potential splitting of logical tables into multiple physical tables.

Populating the Data Mapping Tables

As was stated in the Logical Data Modeling section entity-relationship-diagraming techniques are used to capture the essential application data requirements mandated by the needs of an enterprise. Use of entities, the relationships between them, and their corresponding attributes comprise a logical database design evolved in third normal form as a starting point. Once created, the logical data model is used to generate a physical data representation from which a database description may be produced via standard Database Description Language (DDL). The present invention may be implemented by modifying the logical to physical database implementation strategy. As the physical database is created, and logical tables are divided into multiple physical tables for performance reasons, the corresponding join criteria for those physical tables are included in the logical data model for the logical entities (tables) requiring multiple physical tables. This information is utilized to build the Data Mapping Join Table. The physical table names and physical column names must also be captured and are utilized to populate the Data Mapping Logical to Physical table. If an automated tool is utilized, such as ADW, this information may be captured using one of the many descriptive areas in the case tool's representation of the Logical Data Model. The information captured relates the logical data model to the physical data model and permits the DMTs to be populated. There are of course many techniques for populating the DMTs, one technique is to use the descriptive areas of a CASE tool Logical Data Model, export files from the CASE tool and then process these exported files with a utility that then populates the DMTs. Alternatively, the DBA can populate the tables having access to the logical and physical database descriptions. The DBA could be assisted by a software utility that prompts the DBA for required information. The use of descriptive areas of the Logical Data Model, as it represented in the ADW case tool, and the use of the ADW export files by a Data Mapping Utility that processes the export files to create the DMTs is described in detail below.

Population of the DMTs may be streamlined by embedding Logical to Physical mapping data in the form of tags in the Application's Logical Data Model. These tags are embedded in the descriptive areas of the Logical entity types and their logical attributes. The Logical Data Model is exported with the embedded tag information. These tags are then processed by a utility program, the Data Mapping Utility (DMU), which builds and populates the DMTs. As (or after) the physical database description is completed in the ADW case tool, tags containing the physical table and columns names are placed in the logical attribute description area. The ADW CASE tool is used to generate the export files for the logical design, and also to used to create the DDL necessary for generation of the physical database for the Application(s).

In adding information to the descriptive areas of the LDM the following rules simplify DMU processing, if used when updating the Logical Data Model:

1. All entities and attributes are in upper case.
2. All primary keys names are suffixed with 'PK'
3. As physical tables and columns are defined, they are reflected back to the logical model via the following format:
   :ApplicationName.TableName.ColumnName
4. When logical entities are divided into multiple physical tables, the join criteria between those tables must be defined in the following form:
   :ApplicationName-S. LogicalEntityName.TableName-.ColumnName.condition.TableName.ColumnName This format specifies the conditions under which columns between tables are joined. If multiple columns need to be joined, then the format above can be repeated with a comma separating the join conditions. The comma implies an AND relationship between the join conditions. For example: T1.C1.EQ.T2.C2,T1.C2.NE.T3.C3 would be interpreted as (T1.C1 EQ T2.C2) AND (T1.C2 NE T3.C3) where T1, T2, and T3. are physical table names, and C1, C2, and C3 are physical column names within those tables, respectively. The application Name that the join applies to is specified by the ApplicationName. The "-s" indicates that this join results from a split table (where one logical entity splits into multiple physical tables). The LogicalEnityName specifies the logical entity that is represented by one or more physical tables.

5. When foreign keys are identified in a table, the target(s) of the foreign key must be specified in the comment area where the foreign key is defined. The format used is:
   &FK.ApplicationName.LogicalEntryName.LogicalAttribute.physTableName.physColName For example, an entity named CUSTOMER is created in the logical data model using the KEY: Analysis Workstation (ADW) from Sterling Software. Attributes are then added such as CUST_BIRTH_DATE
CUST_CITY
CUST_FIRST_NAME
CUST_GENDER
CUST_LANGUAGE_PREFERRED
CUST_LAST_NAME
CUST_MARITAL_STATUS
CUST_NUM_PK
CUST_PHONE_NUM
CUST_POSTAL_CODE
CUST_SOCIAL_SECURITY_NUM
CUST_STATE
CUST_STREET Each of the above attributes is updated to reflect its intended physical naming convention within the Comment field of the CASE tool for the logical attribute. For the Customer CUST_LAST_NAME attribute, the structure would be: pos.CUSTOMER.CUSTLASTNM where 'pos' represents the application name 'CUSTOMER' is the physical table name 'CUSTLASTNM' is the physical column name. Each of the remaining attributes would follow similar naming conventions. Each additional application using these attributes would have a dedicated line appended to the Comment field as the one above.

Data Mapping Utility

FIG. 3 shows the Data Mapping Utility 303. In the preferred embodiment the Data Mapping Utility (DMU) is a C++ program which uses the export files from the Logical Data Model as input. The DMU analyzes the export files to determine the logical entity types and their logical attributes, as well as their corresponding physical table names and physical column names. In the preferred embodiment the DMU 303 determines the logical entities from the ADW object export file (oi.exp—listing of all data model object types). The DMU correlates the logical entities with the associations export file (ai.exp—listing of all data model associations) to determine the logical attributes associated with the logical entities. Finally, the DMU correlates the logical entities and attributes to the physical table names and physical column names and join criteria via the ADW textual export file (ti.exp—listing of all data model textual information). The physical representation of the logical data model is captured in the text information (i.e., the imbedded tags) associated with description field. (pi.exp—listing of all data model properties)

The DMU 303 takes the logical to physical mappings it has found, and populates two relational database tables. The first RDB table is the Data Mapping Logical to Physical Table (DMTLTOP) 307. The DMTLTOP 307 provides the translation from logical table names from the Logical Data Model 301 to physical table names that are used in the RDB. The second RDB table populated by the DMU 303 is the Data Mapping Join Table (DMTJOIN) 305. The DMTJOIN 305 provides the join criteria between physical tables in the relational database, where the multiple physical tables resulted from the splitting of a logical table in the Logical Data Model into multiple physical tables. While the DMU for this invention is written in C++, it like the other components can be written in any programming language. The DMTLTOP 307 and DMTJOIN 305 are described in more detail above. Note that although each Application could have its own associated DMTs it is preferable that all applications, using a RDB sham the dame DMTs.

DMU Detailed Description

The following SQL defines tables used by the DMU program in analyzing the ADW export files. DMU processing consists of reading the export files into temporary database files and performing the actual logical to physical conversion. The following statements create the tables required by the DMU.

```
CREATE TABLE OIRDB (LOGICALTABLEOID VARCHAR(11)NOT NULL,
        LOGICALTABLENAME VARCHAR(32)NOT NULL,
        PRIMARYKEY(LOGICAL TABLEOID)
CREATE TABLE PIRDB (SUBJID CHAR(11) NOT NULL,PITYPE CHAR(5) NOT NULL,
        SEQ SMALLINT,PINAME CHAR(32) NOT NULL)
CREATE TABLE AIRDB (AIID CHAR(11) NOT NULL,AITYPE CHAR(5) NOT NULL,
        FROMID CHA(11) NOT NULL, TOID CHAR(11) NOT NULL,
        PRIMARY KEY (AIID))
CREATE TABLE TIRDB (OID CHAR(11) NOT NULL, OIDTYPE CHAR(5) NOT NULL,
        SEQENCE SMALLINT NOT NULL, TEXT VARCHAR(73),
        PRIMARY KEY (OID, OIDTYPE, SEQUENCE))
CREATE TABLE DMT (LOGTABLECHAR(32) NOT NULL,
        LOGCOLUMN CHAR(32) NOT NULL,
        APPLICATION CHAR(18) NOT NULL,
        PHYSTABLE CHAR(18) NOT NULL,PHYSCOLUMN CHAR(18),
        PRIMARY KEY (LOGTABLE, LOGCOLUMN, APPLICATION, PHYSTABLE))
CREATE TABLE DMTJOIN (LOGTABLE1 VARCHAR(332) NOT NULL,
        LOGTABLE2 VARCHAR(32),
        APPLICATION VARCHAR(18) NOT NULL,
        JOINCRITERIA VARCHAR(1000) NOT NULL,
        PRIMARY KEY (LOGTABLE1, APPLICAITON))
```

The OIRDB table represents the oi.exp export file from ADW. The PIRDB table represents the pi.exp export file from ADW. The AIRDB table represents the ai.exp export file from ADW. The TIRDB table represents the ti.exp export file from ADW. The following paragraphs describe how the Data Mapping Utility pulls this information into the DMTLTOP and DMTJOIN tables used by the Data Access Class.

The DMU utilizes the above tables to process information from the export files. The first step in the process is the parsing of the oi.exp file from ADW. This file contains all the data entities described in the logical data model. The records in the oi.exp file have 3 components. The first is the OID in, which is in columns 1 to 11 of the record. This is a unique identifier for the data entity. It is followed by a comma, and the OID Type. The DMU is interested in OID Type 10007 records. Details of ADW Export record formats can be found in the ADW documentation (ADW/Encyclopedia Management hereby incorporated by reference). Next is a comma followed by a data field in columns 20 thru 32 of the oi.exp record. The data field is the logicalTableName.

The ai.exp export file is examined and the data put in the ADRDB table in the RDB. By placing this export information in the RDB, the DMU can then take advantage of SQL query capabilities to pull the information needed for the DMTLTOP and DMTJOIN tables. The ai.exp file contains attribute relationships for each logical attribute defined in every logical data entity in the Logical Data Model.

The pi.exp export file from ADW is then processed. This file contains information about the logical columns that relate to the ai.exp file. The only information of interest to the DMU in the pi.exp file are the records that have an object identifier (OLD) type of '30011'. These records are placed into the PIRDB RDB table.

The ti.exp export file from ADW is read. The ti.exp file contains the description areas of the logical attributes. It is this file that also contains the physical column names and join criteria that apply from the physical data tables back to the logical data entities in the model. The tag information is extracted from this file. The DMU searches the ti.exp file for records with an OIDTYPE of '30077'. The tag information extracted is placed into the OIRDB table.

After reading and extracting appropriate data from the ADW export files and placing this information in the various tables (OIRDB, AIRDB, TIRDB, and PIRDB) the tables are joined and the following search is performed.

```
select logicaltablename, piname, subjid, text, oid, sequence
    from oirdb, pirdb, airdb, tirdb
        where toid=logicaltableoid AND
            aitype='20007' AND
                fromid=subjid AND
                oid=subject ORDER BY
                logicaltablename ASC, oid ASC, sequence ASC;
```

This search returns records from the database that contain the logical Data entity Name, and the physical Table name, along with the application subject area. Next the data in the text field returned by the select statement above is interrogated to see if it contains any of the tags as discussed previously. The DMU uses the following statement to retrieve multiple lines from the TIRDB table.

```
select text, sequence from tirdb
    where oid=:SUBJID AND oidtype='30077'
        ORDER BY sequence ASC;
```

These lines are concatenated together to form a complete tag. The need for this processing is dictated by the way ADW stores this information into the ti.exp file. ADW stores a maximum of 73 characters into the text field. The tag commands described above can be greater than 73 characters. When ADW finds the tag with greater than 73 characters, ADW generates an additional record with the same OIDTYPE, and increments the sequence number. The SQL statement above retrieves those lines from the TIRDB table, ordered by their sequence number. The DMU pulls these records together to form one long data string, which contains the tag command. The DMU parses the tag and determines the physical table and column to use, along with any join criteria for that table (used when tables are split). If the TIRDB file contains a foreign key tag (&FK), then there is a pointer to additional table(s) that use this attribute as a foreign key. The DMT is updated for the additional table(s) to indicate that they also contain this attribute.

At this point, the DMU has determined all the logical attributes for a Logical Data Entity, and determined the physical table(s) and column(s) that correspond to the logical data entity. This information is written to the DM Logical to Physical Table. Any join information (in the case of split tables) is also known for the logical data entity at this point in time, and is written to the DM JOIN table.

As the AIRDB, OIRDB, PIRDB, and TIRDB tables are being built, data is committed every 25 transactions. Any errors found in interpreting the ADW export files are written to an output file from the DMU. This output file is useful in not only documenting errors, but often shows errors at the logical data model level where the physical implementation is missing, or partially complete. If no errors are found, the file is empty.

EXAMPLES OF OPERATION

The following examples shows how the logical names from a data model are used in Application. All examples are shown using C++. Each example demonstrates the use of logical data access by specifying logical entities and their associated attributes. The first example shows Application code for application ABC. This code sequence shows the Application statements necessary to use the DAC to setup the SQL statements having the appropriate physical table names and associated physical column names.

customers from the logical CUSTOMER entity who are married, and then prints out their names. It uses the Logical data model shown in FIG. 5 and the physical tables show in FIG. 6 and the DMT mapping tables are depicted in FIG. 7 and FIG. 8. The use of both DMTs is required since the logical Customer Table consists of two Physical tables (i.e., namely CUSTOMER and INTCUST). The Application code for accomplishing this query using the present invention is shown below.

```
/* create an instance of the Data Access class */
fSQL * sqlClassD = new fSQL( );
/* allocate the return code */
    ULONG rc;
/* we want to get the lastname, firstname and customerid from the db*/
    rc=dac—>setItemList(ABC.CUSTOMER.CustomerId,ABC.CUSTOMER.LastName,
                    ABC.CUSTOMER.FirstName,ABC.CUSTOMER.CustomerID);
/* set the search condition to only return customers who live in Va. */
    rc=dac—>setSearchCondition("ABC.CUSTOMER.State='Virginia'");
```

The next example takes a selection of data from a database split table. This example shows the selection of all

```
// create an instance of the fSQL class
fSQL * sqlClassD = new fSQL ( );
long rc=0;
// start the database manager
rc=sqlClassD—>sql_start ( );
// logon to the database manager
rc=sqlClassD—>sql_logon(userid,password);
// open the specific database
rc = sqlClassD—>sql_open(rdbName);
// build the selectList. The names in the select list are
// logical names that the application is trying to access
IString selectList;
selectList="POS.CUSTOMER.CUST_LAST_NAME,
            POS.CUSTOMER.CUST_FIRST_NAME";
// tell the data access class about the logical selection List. At this point the data access class will
// read the DMT table and determine the physical table(s) and column(s) to access
rc=sqlClassD—>setItemList (selectList);
// build the where clause - this constrains the select statement
IString whereClauseD;
rc=whereClauseD="POS.CUSTOMER.CUST_MARITAL_STATUS='M'";
// build the where clause. At this point, the data access class will read the DMT table and
// determine the physical table(s) and column(s) to use for the search condition.
sqlClassD—>setSearchCondition(whereClauseD);
// allocate the space for the sqlda
sqlda * inputSelectSqldaD;
sqlda * outputSelectSqldaD;
// the buildSelectStmt method returns an SQL select statement that contains the PHYSICAL
// tables and columns that correspond to the logical tables and columsn previously specified. It
// also returns the physical SQLDA.
IString selectStmtD;
sqlClassD—>buildSelectStmt(&selectStmtD,&inputSelectSqldaD,
```

-continued

```
          &outputSelectSqldaD);
// At this point, the select statement is returned to the application with physical
// table and column names.
// Note that using dynamic SQL all statements must be Prepared prior to execution. This is a
standard dynamic RDB statement:
sqlClassD—>sql_prepare(selectStmtD,"selectStmtD",0);
// describe the stmt into the output sqlda where the results of the select stmt will go. All dynamic
//select SQL statements must be described. This is a standard dynamic RDB statement.
sqlClassD—>sql_describe("selectStmtD", outputSelectSqldaD,0);
// the select statement may return more than one row from the database. The sql_declareCursor is
// a standard SQL statement for processing multiple rows returned from the database
rc=sqlClassD—>sql_declareCursor("selectCursor", "selectStmtD",0);
// open the cursor, This is also a standard SQL statement
rc=sqlClassD—>sql_openCursor("selectCursor",inputSelectSqldaD,0);
// retrieve multiple rows from the database
while (rc==0)
  {
  // retrieve a row from the database. the Data requested
  // logical COL1, COL2, and COL3 are in the outputSelectSqldaD
  rcD=sqlClassD—>sql_fetch ("selectCursor", outputSelectSqldaD,0);
  if (rcD != 0)
    {
    // leave the loop
    break;
    }
  // get the last name and city from the sqlda
  IString lastName="";
  IString firstName="";
  SqlClassD—>getVarFromSqlda("POS.CUSTOMER.CUST_LAST_NAME",
              &lastName,&outputSelectSqldaD);
  SqlClassD—>getVarFromSqlda("POS.CUSTOMER.CUST_FIRST_NAME",
              &firstName,&outputSelectSqldaD);
  // print out the results of the query
  cout << " name = " << firstName << " " << lastName << endl;
  } // end while
// close the cursor
sqlClassD—>sql_closeCursor ("selectCursor",0);
delete sqlClassD);
```

The SQL Select statement generated by the DAC in response to the POS application's request are as follows below:

```
SELECT CUSTOMER.CUSTLASTNM, CUSTOMER.CUSTFIRSTNM FROM
    CUSTOMER WHERE ((INTCUST.INTCUSTMARSTATUS='M')
    AND (CUSTOMER.CUSTLASTNM = INTCUST.INTCUSTLASTNM)
    AND (CUSTOMER.CUSTFIRSTNM=INTCUST.INTCUSTFIRSTNM)
    AND (CUSTOMER.CUSTSSN = INTCUST.INTCUSTSSN))
```

The third example demonstrates a very important feature of the present invention. This is the ability to update views. The next example shows the statements necessary for updating the logical entity CUSTOMER. The next example demonstrates updating a logical entity. In this example the marital status of a Jane Doe is changed to married. To insert a row into customer may require several SQL statements since the Logical table consist of two physical tables. This example uses the Logical data model shown in FIG. 5 and the physical tables show in FIG. 7 and the DMT mapping tables depicted in FIG. 8. The use of both DMTs is required since the logical Customer Table consists of two Physical tables (i.e., namely CUSTOMER and INTCUST).

```
// create an instance of the fSQL class
fSQL * sqlClassD = new fSQL( );
long rc=0;
// start the database manager
rc=sqlClassD—>sql_start( );
// logon to the database manager
rc=sqlClassD—>sql_logon(userid,password);
// open the specific database
rc = sqlClassD—>sql_open(rdbName);
// build the selectList. The names in the select list are logical names that the application is trying to
// access
IString selectList;
selectList="POS.CUSTOMER.CUST_MARITAL_STATUS";
// tell the data access class about the logical selection List At this point the data access class will
```

```
// read the DMT table and determine the physical table(s) and column(s) to access
rc=sqlClassD—>setItemList (selectList);
// build the where clause - this constrains the update statement. The question marks are place
// holders that the database manager fills in with values from the sqlda.
IString whereClauseD;
rc=whereClauseD="(POS.CUSTOMER.CUST_LAST_NAME=?) AND (
    (POS.CUSTOMER.CUST_FIST_NAME=?)";
// build the where clause. At this point, the data access class
// will read the DMT table and determine the physical table(s)
// and column(s) to use for the search condition.
sqlClassD—>setSearchCondition (whereClauseD);
// allocate the space for the sqlda
sqlda * inputSqldaD;
// put the constrain variables in the dqlda. While these values
// are hard coded ehre, they could be input from a user interface,
// or passed in as parameters to the program.
sqlClassD—>putVarIntoSearchCondition("POS.CUSTOMER.CUST_LAST_NAME",
    "Doe");
sqlClassD—>putVarIntoSearchCondition("POS.CUSTOMER.CUST_FIRST_NAME",
    "Jane");
sqlClassD—>putVarIntoSqlda("POS.CUSTOMER.CUST_MARITAL_STATUS",
    "M");
// the buildUpdateStmt method builds the physical UPDATE
// statement. Since multiple tables may be involved in the update
// we need to get the number of tables via the getNumTables method,
// and then loop through getting an update statement for each table
// that needs to be updated.
IString updateStmtD;
sqlClassD—>buildUpdateStmt( );
int numTables=sqlClassD—>getNumTables( );
// loop through getting one update statement per table
for (int I=0; i<numTables; I++)
{
    sqlClassD—>getUpdateStmt(I,&updateStmtD,&inputSqldaD);
    // At this point, the update statement that is returned
    // has the physical table and column names in it, and
    // is the following:
    //   UPDATE INTCUST SET INTCUST.INTCUSTMARSTATUS=?
    //   WHERE (INTCUST.CUSTLASTNAME=?) AND
    //       (INTCUST.CUSTFIRSTNAME=?)
    // since INTCUST is the only physical table with
    // marital status in it, the numTables will
    // have a value of 1, and this loop will only be
    // executed once.
    // prepare the statement.
    sqlClassD—>sql_prepare(updateStmtD,"updateStmtD",0);
    // execute the statement
    rc=sqlClassD—>executeUsing("updateStmtD",inputSqldaD);
    // rc will be the return code from the database manager
} // end for
delete sqlClasssD
```

Note in the SQL statements below that the Application does not require any infromation on the two physical tables or their join criteria. The SQL statements generated by the DAC in response to the POS application's request to update Customer Logical entity type or logical table is as follows below:

```
UPDATE INTCUST SET INTCUST.INTCUSTMARSTATUS=?
WHERE (INTCUST.CUSTLASTNAME=?) AND
    (INTCUST.CUSTFIRSTNAME=?)
```

To demonstrate the flexibility of the present invention the Logical entity Customer can be split into another table. For instance the Customer's address could be stored in another Physical table named CUSTADDR having the physical column names ADRCUSSSN, CUSTSTREET, CUST CITY, CUSTPOSTLCD. All that needs to be changed is entries in each of the DMTs. The DM Logical to Physical table needs to be changed to reflect the new table location for this data. The DM Join table also needs to updated to reflect that the Customer entity type or logical table is composed of three physical tables. No application code needs to be modified.

Note that in each of the above examples all other Application code would be the same as it would be without logical data access.

Implementation

Figure 10:
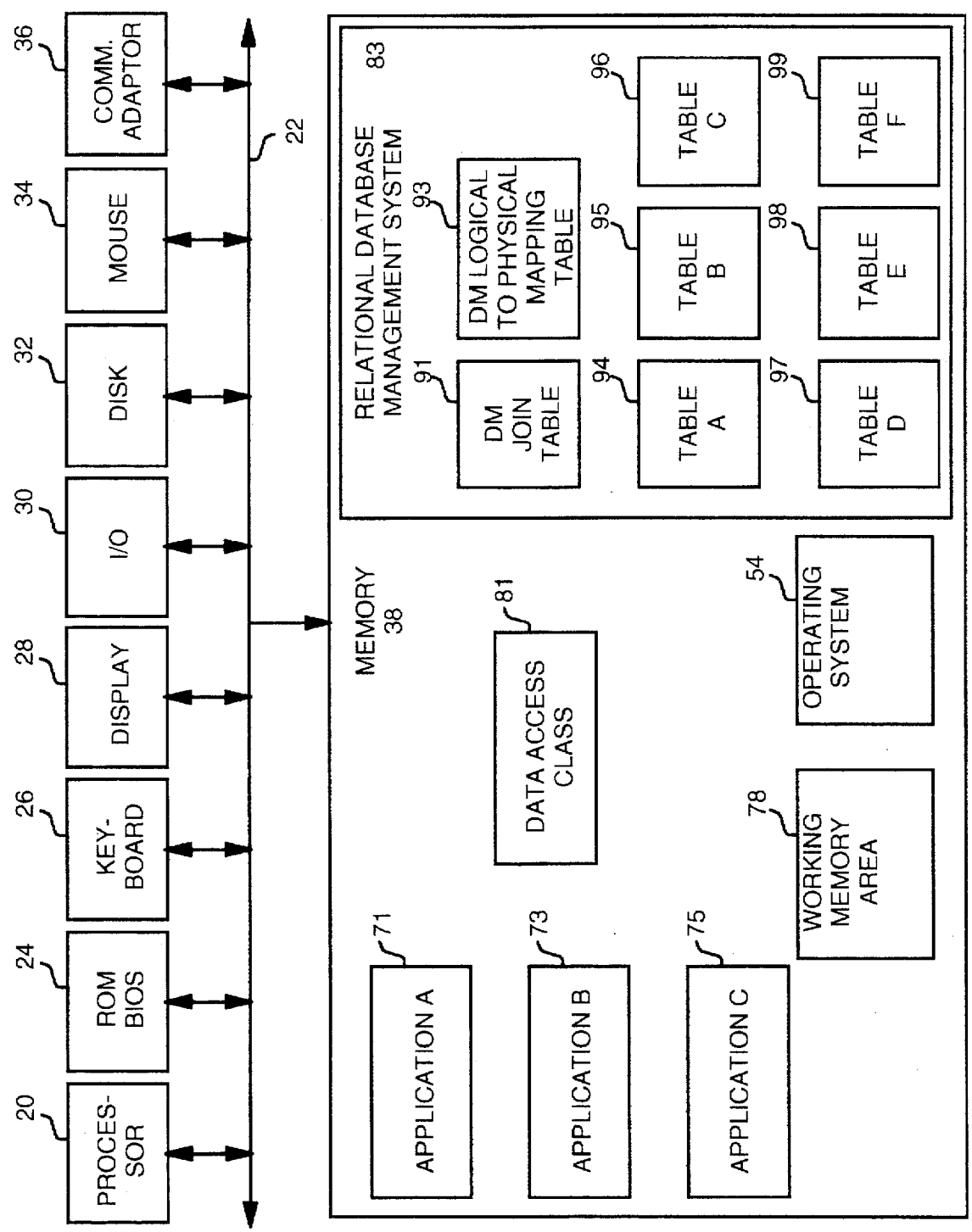
FIG. 10 A computer system in accordance with the present invention
Figure 11:
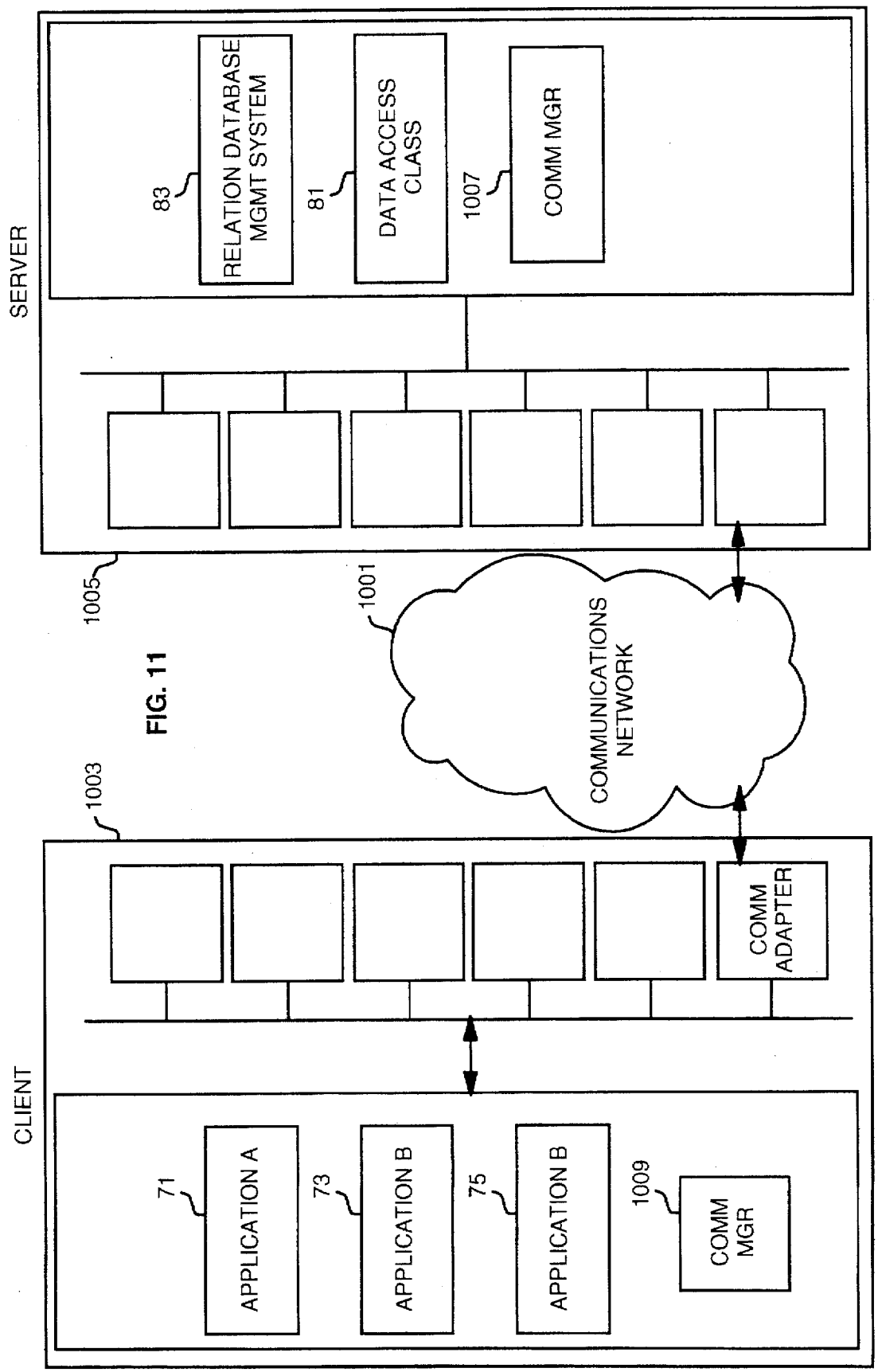
FIG. 11 A client/server system in accordance with the present invention.

The present invention may be implemented in a single computer system as shown in FIG. 10 or in a distrubuted system as shown in FIG. 11. The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function or collection of functions, which can be added to an existing computer system to provide new function to that computer system. Software systems generally are constructed in a layered fashion. In a layered system, a lowest level software system is usually the computer operating system which enables the hardware to execute software instructions. Additional layers of software systems may provide, for example, a graphical user interface or window management system capabilities.

These software systems provide a foundation on which additional software systems can be built.

A software system is thus understood to be a software implementation of a function which can be assembled in a computer system providing new functionality. The software system for controlling a computer in accordance with the present invention may be distributed on a computer usable medium such as floppy disk, diskettes, CD-ROM, PCMCIA cards, Flash memory cards and/or any other computer usable medium. Note that the software system may obtained from a server computer system and may also be downloaded from an bulletin board or Internet node. Also, in general, the interface provided by one software system to another software system is well-defined. It should be understood in the context of the present invention that delineations between software systems are representative of the preferred implementation.

However, the present invention may be implemented using any combination or separation of software systems.

The preferred embodiment of this invention comprises a set of software systems for providing Logical Data Access to a relational database. A single computer system in accordance with the present invention is shown in FIG. 10. FIG. 10 includes a processor 20 connected by means of a system bus 22 to a read only memory (ROM) 24 and memory 38. Memory 38 may consist of any of the following in combination or alone: disk, flash memory, random access memory or read only memory or any other memory technology. Also included in the computer system in FIG. 10 are a display 28 by which the computer presents information to the user, and input devices including a keyboard 26, mouse 34 and other devices that may be attached via input/output port 30. Other input devices such as other pointing devices or voice sensors or image sensors may also be attached. Other pointing devices include tablets, numeric keypads, touch screens, touch screen overlays, track balls, joy sticks, light pens, thumb wheels, etc. The I/O 30 can be connected to communication lines, disk storage, input devices, output devices, other I/O equipment or other computer systems.

The memory 38 contains several applications 71, 73 and 75 requiring Logical Data Access. The Data Access Class 81 and relational database mangement system 83 software systems are also shown in memory. The database management system may be IBM'S DB2. Note that the DM Join Table 91, DM Logical to Physical table 93 and several physical application tables, 94–99 are shown in the DBMS 83. A working memory area 78 is also shown in memory 38. The working memory area 78 can be utilized by any of the elements shown in memory 38. The working memory area 78 may be partitioned amongst software systems and within software systems. The working memory area 78 may be utilized for communication, buffering, temporary storage or storage of data while a software system or function is running. Also shown in memory is the operating system 54.

A distributed computer system is shown in FIG. 11 with a client system 1003 connected to a server system 1005 via a communications network 1001. Applications 71, 73 and 75 in the client system 1003 interface with the DAC 81 via the communication network 1001. Note that although only one client in the system is shown in FIG. 11 there could be a plurality of clients each with one or more applications. The Applications and the DAC may make use a communication manager software system and a communications adaptor to provide access to and from the communications network. The communication network may consist of a modem to modem connection, optical fiber, copper wire or wireless connection using any applicable communications protocol.

The Applications may access the DAC using remote procedure calls or packets or messages. The DAC on the server returns results to requesting clients via the communications network. This communications network may also be provided via the INTERNET. Note that in an alternative embodiment a DAC may reside in each client.

Advantages

The present invention allows an application programmer to program at a logical data level, instead of at the physical database level. The physical database structure of tables can be modified without requiring an application to be re-written using the new physical database tables. The invention greatly enhances the ability for Data Administration personnel to tune an existing database design, while isolating the applications which access data from it.

The Present Invention provides several advantages over prior art Database Access techniques. First, Applications can view distributed data as a single logical resource. The Applications do not have to know on which systems the physical tables reside. In fact the Application use of single logical view divorces the Application from any location or network specific information from being included in the Application. Secondly, Database access is simplified through a uniform Application Programming Interface (API) that makes database implementation transparent to applications and application programmers. This translates into reduced development and maintenance costs for Applications. Thirdly, the present invention provides a level of integration for multiple applications to share common data. If an enterprise data model is used in developing all of an enterprises applications and data requirements the Applications can share common data. Fourthly, the present invention permits fine-tuning and/or totally reengineering of the database design for maximum performance with out the need to update or modify applications.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A computer system comprising:

one or more applications each having a logical data access interface for requesting data access in accordance with a logical data model, said logical data model having a plurality of interrelated logical entity types with each logical entity type having a plurality of logical attributes;

a relational database management system containing a plurality of physical tables, said physical tables derived from said logical data model, each of said physical tables having a plurality of columns;

a logical to physical data mapping table for mapping each logical entity type and logical attribute pair to a physical table name and a physical column name as stored in the relational database management system;

a join table having a join entry for each logical entity type represented by more than one physical table in the relational database management system, each join entry identifying the physical tables to join, the physical columns to join, and the join criteria necessary to form the logical entity type represented by the join entry;

a logical data access module for receiving a logical database request from a requesting application via the requesting applications's logical data interface, forming one or more database queries having physical table and physical column names using said logical to physical data mapping table and said join criteria table.

2. The computer system of claim 1 wherein said logical data access module executes said formed queries and returns the results of said query execution to the requesting application.

3. The computer system of claim 1 wherein the data access module forms the queries in SQL.

4. The computer system according to claim 1 wherein:
the logical data request consist of one or more commands with at least one command containing parameters that specify a logical entity type and a logical entity type attribute.

5. The computer system according to claim 3 wherein the requesting application receives the queries generated by the logical data access module and causes the queries to be prepared and executed.

6. The computer system according to claim 5 wherein the join table and the logical to physical mapping table are stored with the relational database management system.

7. The computer system according to claim 6 wherein the logical data request also includes an application identifier and the logical to physical mapping table and the join table each include an application identifier column.

8. A method of accessing data in a relational database comprising:
receiving a logical data request that specifies logical entity types and logical entity type attribute in accordance with a logical data model;
parsing said logical request to obtain one or more logical entity type and logical attribute tuples;
mapping each logical entity type and logical attribute tuple to a physical table and a physical table column;
obtaining the join criteria for each logical entity type represented by more then one physical tables, the join criteria associated with the logical entity type specifying how to join the physical tables representing the logical entity type to form the logical entity type table;
building one or more dynamic SQL statements in accordance with the logical data request that may be executed against the physical tables in the relational database.

9. The method of claim 8 wherein the logical data request contains an application identifier that is parsed along with the logical entity type and the logical attribute and is used in the mapping and obtaining join criteria steps.

10. The method of claim 8 wherein the join criteria obtained is parsed to determine the physical tables and associated physical columns to use in join statements and the join conditions on which to join the columns.

11. An article of manufacture comprising a computer useable medium having a computer readable program embodied in said medium, wherein the computer readable program when executed on a computer causes the computer to:
receive a logical data request that specifies logical entity types and logical entity type attribute in accordance with a logical data model;
parse said logical request to obtain one or more logical entity type and logical attribute tuples;
map each logical entity type and logical attribute tuple to a physical table and a physical table column;
obtain the join criteria for each logical entity type represented by more then one physical tables, the join criteria associated with the logical entity type specifying how to join the physical tables representing the logical entity type to form the logical entity type table;
build one or more dynamic SQL statements in accordance with the logical data request that may be executed against the physical tables in the relational database.

12. The article of manufacture of claim 11 wherein the computer usable medium is a cd-rom.

13. The article of manufacture of claim 11 wherein the computer usable medium is one or more diskettes.

14. The article of manufacture of claim 11 wherein the computer usable medium is the memory of a workstation accessible via a communications network.

15. The article of manufacture of claim 14 wherein the communications network is the INTERNET.

16. A computer system comprising:
one or more applications each having a logical data access interface for requesting data access in accordance with a logical data model, said logical data model having a plurality of logical tables with each logical table having a plurality of logical attributes;
a relational database management system containing a plurality of physical tables, said physical tables derived from said logical tables, each of said physical tables having a plurality of columns;
a logical to physical data mapping table for mapping each logical table and logical table attribute pair to a physical table name and a physical column name as stored in the relational database management system;
a join table having a join entry for each logical table represented by more than one physical table in the relational database management system, each join entry identifying the physical tables to join, the physical columns to join, and the join criteria necessary to form the logical table represented by the join entry;
a logical data access module for receiving a logical database request from a requesting application via the requesting applications's logical data interface, forming one or more database queries having physical table and physical column names using said logical to physical data mapping table and said join criteria table.

* * * * *